(12) United States Patent
Kothari

(10) Patent No.: US 8,008,736 B2
(45) Date of Patent: *Aug. 30, 2011

(54) ANALOG INTERFEROMETRIC MODULATOR DEVICE

(75) Inventor: Manish Kothari, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 1233 days.

This patent is subject to a terminal disclaimer.

(21) Appl. No.: 11/144,546

(22) Filed: Jun. 3, 2005

(65) Prior Publication Data

US 2006/0065940 A1   Mar. 30, 2006

Related U.S. Application Data

(60) Provisional application No. 60/613,465, filed on Sep. 27, 2004.

(51) Int. Cl.
*H01L 29/82* (2006.01)
(52) U.S. Cl. .......................................... 257/415; 359/290
(58) Field of Classification Search .................. 359/290; 257/415
See application file for complete search history.

(56) References Cited

U.S. PATENT DOCUMENTS

| | | | |
|---|---|---|---|
| 2,534,846 A | 12/1950 | Ambrose et al. | |
| 2,590,906 A | 4/1952 | Tripp | |
| 2,677,714 A | 5/1954 | Auwarter | |
| 3,247,392 A | 4/1966 | Thelen | |
| 3,439,973 A | 4/1969 | Paul et al. | |
| 3,443,854 A | 5/1969 | Weiss | |
| 3,653,741 A | 4/1972 | Marks | |
| 3,656,836 A | 4/1972 | de Cremoux et al. | |
| 3,679,313 A | 7/1972 | Rosenberg | |
| 3,725,868 A | 4/1973 | Malmer, Jr. et al. | |
| 3,728,030 A | 4/1973 | Hawes | |
| 3,813,265 A | 5/1974 | Marks | |

(Continued)

FOREIGN PATENT DOCUMENTS

DE   4108966 A1   8/1992

(Continued)

OTHER PUBLICATIONS

U.S. Appl. No. 11/444,467.*

(Continued)

*Primary Examiner* — Samuel A Gebremariam
(74) *Attorney, Agent, or Firm* — Knobbe Martens Olson & Bear LLP

(57) ABSTRACT

Disclosed is new architecture of microelectromechanical system (MEMS) device. The device has a partially reflective optical layer, a deformable mechanical layer and a mirror layer, each of which forms an independent electrode. A support post separates the optical layer from the mechanical layer. The mirror layer is located and movable between a first position and a second position, which are located between the optical layer and the mechanical layer. The mirror is spaced from the support post, and mirror is responsive to voltages applied to the three electrodes, thereby moving between the first position and the second position. By applying various combinations of voltage differences between the optical layer and the mirror, and between the mirror and the mechanical layer, the location of the mirror between the first and second positions is tunable throughout the space between the two positions. The tunable MEMS device can be used as an analog display element or analog electrical device such as a tunable capacitor. The MEMS device of the disclosed architecture can also be operated in a non-analog manner.

21 Claims, 12 Drawing Sheets

U.S. PATENT DOCUMENTS

| | | |
|---|---|---|
| 3,886,310 A | 5/1975 | Guldberg et al. |
| 3,955,190 A | 5/1976 | Teraishi |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,421,381 A | 12/1983 | Ueda et al. |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,497,974 A | 2/1985 | Deckman et al. |
| 4,498,953 A | 2/1985 | Cook et al. |
| 4,500,171 A | 2/1985 | Penz et al. |
| 4,519,676 A | 5/1985 | te Velde |
| 4,531,126 A | 7/1985 | Sadones |
| 4,560,435 A | 12/1985 | Brown et al. |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,655,554 A | 4/1987 | Armitage |
| 4,662,746 A | 5/1987 | Hornbeck |
| 4,663,083 A | 5/1987 | Marks |
| 4,666,254 A | 5/1987 | Itoh et al. |
| 4,681,403 A | 7/1987 | te Velde et al. |
| 4,710,732 A | 12/1987 | Hornbeck |
| 4,748,366 A | 5/1988 | Taylor |
| 4,779,959 A | 10/1988 | Saunders |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,859,060 A | 8/1989 | Katagiri et al. |
| 4,900,136 A | 2/1990 | Goldburt et al. |
| 4,900,395 A | 2/1990 | Syverson et al. |
| 4,925,259 A | 3/1990 | Emmett |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,973,131 A | 11/1990 | Carnes |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,062,689 A | 11/1991 | Koehler |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,091,983 A | 2/1992 | Lukosz |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,170,283 A | 12/1992 | O'Brien et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,315,370 A | 5/1994 | Bulow |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,328 A | 9/1994 | Fritz et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | Van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,452,138 A | 9/1995 | Mignardi et al. |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,471,341 A | 11/1995 | Warde et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,550,373 A | 8/1996 | Cole et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,561,523 A | 10/1996 | Blomberg et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |

| | | | | | | |
|---|---|---|---|---|---|---|
| 5,602,671 A | 2/1997 | Hornbeck | 6,158,156 A | 12/2000 | Patrick | |
| 5,606,441 A | 2/1997 | Florence et al. | 6,160,833 A | 12/2000 | Floyd et al. | |
| 5,608,468 A | 3/1997 | Gove et al. | 6,171,945 B1 | 1/2001 | Mandal et al. | |
| 5,610,438 A | 3/1997 | Wallace et al. | 6,172,797 B1 | 1/2001 | Huibers | |
| 5,610,624 A | 3/1997 | Bhuva | 6,180,428 B1 | 1/2001 | Peeters et al. | |
| 5,610,625 A | 3/1997 | Sampsell | 6,195,196 B1 | 2/2001 | Kimura et al. | |
| 5,614,937 A | 3/1997 | Nelson | 6,201,633 B1 | 3/2001 | Peeters et al. | |
| 5,619,059 A | 4/1997 | Li et al. | 6,215,221 B1 | 4/2001 | Cabuz et al. | |
| 5,619,365 A | 4/1997 | Rhoads et al. | 6,232,936 B1 | 5/2001 | Gove et al. | |
| 5,619,366 A | 4/1997 | Rhoads et al. | 6,239,777 B1 | 5/2001 | Sugahara et al. | |
| 5,629,790 A | 5/1997 | Neukermans et al. | 6,242,932 B1 | 6/2001 | Hembree | |
| 5,633,652 A | 5/1997 | Kanbe et al. | 6,243,149 B1 | 6/2001 | Swanson et al. | |
| 5,636,052 A | 6/1997 | Arney et al. | 6,262,697 B1 | 7/2001 | Stephenson | |
| 5,636,185 A | 6/1997 | Brewer et al. | 6,282,010 B1 | 8/2001 | Sulzbach et al. | |
| 5,638,084 A | 6/1997 | Kalt | 6,288,472 B1 | 9/2001 | Cabuz et al. | |
| 5,638,946 A | 6/1997 | Zavracky | 6,288,824 B1 | 9/2001 | Kastalsky | |
| 5,641,391 A | 6/1997 | Hunter et al. | 6,295,154 B1 | 9/2001 | Laor et al. | |
| 5,646,729 A | 7/1997 | Koskinen et al. | 6,301,000 B1 | 10/2001 | Johnson | |
| 5,646,768 A | 7/1997 | Kaeriyama | 6,323,982 B1 | 11/2001 | Hornbeck | |
| 5,650,881 A | 7/1997 | Hornbeck | 6,327,071 B1 | 12/2001 | Kimura | |
| 5,654,741 A | 8/1997 | Sampsell et al. | 6,331,909 B1 | 12/2001 | Dunfield | |
| 5,657,099 A | 8/1997 | Doherty et al. | 6,335,235 B1 | 1/2002 | Bhakta et al. | |
| 5,659,374 A | 8/1997 | Gale, Jr. et al. | 6,335,831 B2 | 1/2002 | Kowarz et al. | |
| 5,661,591 A | 8/1997 | Lin et al. | 6,351,329 B1 | 2/2002 | Greywall | |
| 5,661,592 A | 8/1997 | Bornstein et al. | 6,356,254 B1 | 3/2002 | Kimura | |
| 5,665,997 A | 9/1997 | Weaver et al. | 6,356,378 B1 | 3/2002 | Huibers | |
| 5,673,139 A | 9/1997 | Johnson | 6,358,021 B1 | 3/2002 | Cabuz | |
| 5,683,591 A | 11/1997 | Offenberg | 6,376,787 B1 | 4/2002 | Martin et al. | |
| 5,699,181 A | 12/1997 | Choi | 6,377,233 B2 | 4/2002 | Colgan et al. | |
| 5,703,710 A | 12/1997 | Brinkman et al. | 6,381,022 B1 | 4/2002 | Zavracky | |
| 5,710,656 A | 1/1998 | Goossen | 6,384,952 B1 | 5/2002 | Clark et al. | |
| 5,719,068 A | 2/1998 | Suzawa et al. | 6,400,738 B1 | 6/2002 | Tucker et al. | |
| 5,726,480 A | 3/1998 | Pister | 6,407,851 B1 | 6/2002 | Islam et al. | |
| 5,734,177 A | 3/1998 | Sakamoto | 6,417,868 B1 | 7/2002 | Bock et al. | |
| 5,739,945 A | 4/1998 | Tayebati | 6,433,917 B1 * | 8/2002 | Mei et al. | 359/292 |
| 5,740,150 A | 4/1998 | Uchimaru et al. | 6,438,282 B1 | 8/2002 | Takeda et al. | |
| 5,745,193 A | 4/1998 | Urbanus et al. | 6,447,126 B1 | 9/2002 | Hornbeck | |
| 5,745,281 A | 4/1998 | Yi et al. | 6,449,084 B1 | 9/2002 | Guo | |
| 5,751,469 A | 5/1998 | Arney et al. | 6,452,712 B2 | 9/2002 | Atobe et al. | |
| 5,771,116 A | 6/1998 | Miller et al. | 6,456,420 B1 | 9/2002 | Goodwin-Johansson | |
| 5,784,190 A | 7/1998 | Worley | 6,465,355 B1 | 10/2002 | Horsley | |
| 5,784,212 A | 7/1998 | Hornbeck | 6,466,190 B1 | 10/2002 | Evoy | |
| 5,786,927 A | 7/1998 | Greywall et al. | 6,466,354 B1 | 10/2002 | Gudeman | |
| 5,793,504 A | 8/1998 | Stoll | 6,466,358 B2 | 10/2002 | Tew | |
| 5,808,780 A | 9/1998 | McDonald | 6,473,072 B1 | 10/2002 | Comiskey et al. | |
| 5,808,781 A | 9/1998 | Arney et al. | 6,473,274 B1 | 10/2002 | Maimone et al. | |
| 5,818,095 A | 10/1998 | Sampsell | 6,480,177 B2 | 11/2002 | Doherty et al. | |
| 5,825,528 A | 10/1998 | Goossen | 6,496,122 B2 | 12/2002 | Sampsell | |
| 5,835,255 A | 11/1998 | Miles | 6,519,073 B1 | 2/2003 | Goossen | |
| 5,838,484 A | 11/1998 | Goossen et al. | 6,545,335 B1 | 4/2003 | Chua et al. | |
| 5,842,088 A | 11/1998 | Thompson | 6,548,908 B2 | 4/2003 | Chua et al. | |
| 5,867,302 A | 2/1999 | Fleming | 6,549,338 B1 | 4/2003 | Wolverton et al. | |
| 5,870,221 A | 2/1999 | Goossen | 6,552,840 B2 | 4/2003 | Knipe | |
| 5,905,482 A | 5/1999 | Hughes et al. | 6,556,338 B2 | 4/2003 | Han et al. | |
| 5,912,758 A | 6/1999 | Knipe et al. | 6,574,033 B1 | 6/2003 | Chui et al. | |
| 5,914,804 A | 6/1999 | Goossen | 6,589,625 B1 | 7/2003 | Kothari et al. | |
| 5,920,418 A | 7/1999 | Shiono et al. | 6,597,490 B2 | 7/2003 | Tayebati | |
| 5,943,158 A | 8/1999 | Ford et al. | 6,600,201 B2 | 7/2003 | Hartwell et al. | |
| 5,959,763 A | 9/1999 | Bozler et al. | 6,606,175 B1 | 8/2003 | Sampsell et al. | |
| 5,961,848 A | 10/1999 | Jacquet et al. | 6,608,268 B1 | 8/2003 | Goldsmith | |
| 5,986,796 A | 11/1999 | Miles | 6,624,944 B1 | 9/2003 | Wallace et al. | |
| 5,994,174 A | 11/1999 | Carey et al. | 6,625,047 B2 | 9/2003 | Coleman, Jr. | |
| 6,028,689 A | 2/2000 | Michalicek et al. | 6,630,786 B2 | 10/2003 | Cummings et al. | |
| 6,028,690 A | 2/2000 | Carter et al. | 6,632,698 B2 | 10/2003 | Ives | |
| 6,031,653 A | 2/2000 | Wang | 6,635,919 B1 | 10/2003 | Melendez et al. | |
| 6,038,056 A | 3/2000 | Florence et al. | 6,643,069 B2 | 11/2003 | Dewald | |
| 6,040,937 A | 3/2000 | Miles | 6,650,455 B2 | 11/2003 | Miles | |
| 6,046,659 A | 4/2000 | Loo et al. | 6,657,832 B2 | 12/2003 | Williams et al. | |
| 6,046,840 A | 4/2000 | Huibers | 6,660,656 B2 | 12/2003 | Cheung et al. | |
| 6,049,317 A | 4/2000 | Thompson et al. | 6,661,561 B2 | 12/2003 | Fitzpatrick et al. | |
| 6,055,090 A | 4/2000 | Miles | 6,666,561 B1 | 12/2003 | Blakley | |
| 6,056,406 A | 5/2000 | Park et al. | 6,674,090 B1 | 1/2004 | Chua et al. | |
| 6,061,075 A | 5/2000 | Nelson et al. | 6,674,562 B1 | 1/2004 | Miles | |
| 6,097,145 A | 8/2000 | Kastalsky et al. | 6,674,563 B2 | 1/2004 | Chui et al. | |
| 6,099,132 A | 8/2000 | Kaeriyama | 6,680,792 B2 | 1/2004 | Miles | |
| 6,100,861 A | 8/2000 | Cohen et al. | 6,698,295 B1 | 3/2004 | Sherrer | |
| 6,100,872 A | 8/2000 | Aratani et al. | 6,710,908 B2 | 3/2004 | Miles et al. | |
| 6,113,239 A | 9/2000 | Sampsell et al. | 6,738,194 B1 | 5/2004 | Ramirez et al. | |
| 6,147,790 A | 11/2000 | Meier et al. | 6,741,377 B2 | 5/2004 | Miles | |

| Patent No. | Date | Name |
|---|---|---|
| 6,741,383 B2 | 5/2004 | Huibers et al. |
| 6,741,384 B1 | 5/2004 | Martin et al. |
| 6,741,503 B1 | 5/2004 | Farris et al. |
| 6,747,785 B2 | 6/2004 | Chen et al. |
| 6,747,800 B1 | 6/2004 | Lin |
| 6,768,555 B2 | 7/2004 | Chen et al. |
| 6,775,174 B2 | 8/2004 | Huffman et al. |
| 6,778,155 B2 | 8/2004 | Doherty et al. |
| 6,794,119 B2 | 9/2004 | Miles |
| 6,809,788 B2 | 10/2004 | Yamada et al. |
| 6,811,267 B1 | 11/2004 | Allen et al. |
| 6,813,059 B2 | 11/2004 | Hunter et al. |
| 6,819,469 B1 | 11/2004 | Koba |
| 6,822,628 B2 | 11/2004 | Dunphy et al. |
| 6,829,132 B2 | 12/2004 | Martin et al. |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,862,127 B1 | 3/2005 | Ishii |
| 6,867,896 B2 | 3/2005 | Miles |
| 6,870,581 B2 | 3/2005 | Li et al. |
| 6,870,654 B2 | 3/2005 | Lin et al. |
| 6,882,458 B2 | 4/2005 | Lin et al. |
| 6,882,461 B1 | 4/2005 | Tsai et al. |
| 6,891,658 B2 | 5/2005 | Whitehead et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,959,990 B2 | 11/2005 | Penn |
| 6,960,305 B2 | 11/2005 | Doan et al. |
| 6,980,350 B2 | 12/2005 | Hung et al. |
| 6,982,820 B2 | 1/2006 | Tsai |
| 7,002,726 B2 | 2/2006 | Patel et al. |
| 7,008,812 B1 | 3/2006 | Carley |
| 7,009,754 B2 | 3/2006 | Huibers |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,053,737 B2 | 5/2006 | Schwartz et al. |
| 7,072,093 B2 | 7/2006 | Piehl et al. |
| 7,075,700 B2 | 7/2006 | Muenter |
| 7,113,339 B2 | 9/2006 | Taguchi et al. |
| 7,123,216 B1 | 10/2006 | Miles |
| 7,198,973 B2 | 4/2007 | Lin et al. |
| 7,236,284 B2 | 6/2007 | Miles |
| 7,245,285 B2 | 7/2007 | Yeh et al. |
| 7,372,619 B2 | 5/2008 | Miles |
| 7,459,402 B2 | 12/2008 | Doan et al. |
| 7,508,566 B2 | 3/2009 | Feenstra et al. |
| 7,554,711 B2 | 6/2009 | Miles |
| 7,852,544 B2 | 12/2010 | Sampsell |
| 7,898,722 B2 | 3/2011 | Miles |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0014579 A1 | 2/2002 | Dunfield |
| 2002/0015215 A1 | 2/2002 | Miles |
| 2002/0021485 A1 | 2/2002 | Pilossof |
| 2002/0024711 A1 | 2/2002 | Miles |
| 2002/0027636 A1 | 3/2002 | Yamada |
| 2002/0054424 A1 | 5/2002 | Miles |
| 2002/0070931 A1 | 6/2002 | Ishikawa |
| 2002/0075555 A1 | 6/2002 | Miles |
| 2002/0114558 A1 | 8/2002 | Nemirovsky |
| 2002/0126364 A1 | 9/2002 | Miles |
| 2002/0139981 A1 | 10/2002 | Young |
| 2002/0146200 A1 | 10/2002 | Kudrle et al. |
| 2002/0149828 A1 | 10/2002 | Miles |
| 2002/0149834 A1 | 10/2002 | Mei et al. |
| 2002/0149850 A1 | 10/2002 | Heffner et al. |
| 2002/0154422 A1 | 10/2002 | Sniegowski et al. |
| 2002/0167072 A1 | 11/2002 | Andosca |
| 2002/0167730 A1 | 11/2002 | Needham et al. |
| 2002/0186483 A1 | 12/2002 | Hagelin et al. |
| 2002/0197761 A1 | 12/2002 | Patel et al. |
| 2003/0011864 A1 | 1/2003 | Flanders |
| 2003/0015936 A1 | 1/2003 | Yoon et al. |
| 2003/0016428 A1 | 1/2003 | Kato et al. |
| 2003/0029705 A1 | 2/2003 | Qiu et al. |
| 2003/0035196 A1 | 2/2003 | Walker |
| 2003/0043157 A1 | 3/2003 | Miles |
| 2003/0053078 A1 | 3/2003 | Missey et al. |
| 2003/0072070 A1 | 4/2003 | Miles |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0156315 A1 | 8/2003 | Li et al. |
| 2003/0173504 A1 | 9/2003 | Cole et al. |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2003/0210851 A1 | 11/2003 | Fu et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0056742 A1 | 3/2004 | Dabbaj |
| 2004/0058532 A1 | 3/2004 | Miles et al. |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0080807 A1 | 4/2004 | Chen et al. |
| 2004/0100594 A1 | 5/2004 | Huibers et al. |
| 2004/0100677 A1 | 5/2004 | Huibers et al. |
| 2004/0100680 A1 | 5/2004 | Huibers et al. |
| 2004/0124483 A1 | 7/2004 | Partridge et al. |
| 2004/0125281 A1 | 7/2004 | Lin |
| 2004/0125282 A1 | 7/2004 | Lin et al. |
| 2004/0125347 A1 | 7/2004 | Huibers et al. |
| 2004/0136045 A1 | 7/2004 | Tran |
| 2004/0140557 A1 | 7/2004 | Sun et al. |
| 2004/0145049 A1 | 7/2004 | McKinnell et al. |
| 2004/0145811 A1 | 7/2004 | Lin et al. |
| 2004/0147056 A1 | 7/2004 | McKinnell et al. |
| 2004/0147198 A1 | 7/2004 | Lin et al. |
| 2004/0148009 A1 | 7/2004 | Buzzard et al. |
| 2004/0150939 A1 | 8/2004 | Huff |
| 2004/0160143 A1 | 8/2004 | Shreeve et al. |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0179445 A1 | 9/2004 | Park et al. |
| 2004/0184134 A1 | 9/2004 | Makigaki |
| 2004/0184766 A1 | 9/2004 | Kim et al. |
| 2004/0188599 A1 | 9/2004 | Viktorovitch et al. |
| 2004/0201908 A1 | 10/2004 | Kaneko |
| 2004/0207897 A1 | 10/2004 | Lin |
| 2004/0209192 A1 | 10/2004 | Lin et al. |
| 2004/0209195 A1 | 10/2004 | Lin |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0233503 A1 | 11/2004 | Kimura |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0259010 A1 | 12/2004 | Kanbe |
| 2004/0263944 A1 | 12/2004 | Miles et al. |
| 2005/0001828 A1 | 1/2005 | Martin et al. |
| 2005/0002082 A1 | 1/2005 | Miles |
| 2005/0003667 A1 | 1/2005 | Lin et al. |

| | | |
|---|---|---|
| 2005/0014374 A1 | 1/2005 | Partridge et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0038950 A1 | 2/2005 | Adelmann |
| 2005/0042117 A1 | 2/2005 | Lin |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutkowski et al. |
| 2005/0068605 A1 | 3/2005 | Tsai |
| 2005/0068606 A1 | 3/2005 | Tsai |
| 2005/0068627 A1 | 3/2005 | Nakamura et al. |
| 2005/0069209 A1 | 3/2005 | Damera-Venkata et al. |
| 2005/0078348 A1 | 4/2005 | Lin |
| 2005/0117190 A1 | 6/2005 | Iwauchi et al. |
| 2005/0117623 A1 | 6/2005 | Shchukin et al. |
| 2005/0128543 A1 | 6/2005 | Phillips et al. |
| 2005/0133761 A1 | 6/2005 | Thielemans |
| 2005/0157364 A1 | 7/2005 | Lin |
| 2005/0168849 A1 | 8/2005 | Lin |
| 2005/0195462 A1 | 9/2005 | Lin |
| 2005/0195467 A1 | 9/2005 | Kothari et al. |
| 2005/0202649 A1 | 9/2005 | Hung et al. |
| 2005/0249966 A1 | 11/2005 | Tung et al. |
| 2005/0275930 A1 | 12/2005 | Patel et al. |
| 2006/0007517 A1 | 1/2006 | Tsai |
| 2006/0017689 A1 | 1/2006 | Faase et al. |
| 2006/0038643 A1 | 2/2006 | Xu et al. |
| 2006/0044654 A1 | 3/2006 | Vandorpe et al. |
| 2006/0066599 A1 | 3/2006 | Chui |
| 2006/0066640 A1 | 3/2006 | Kothari et al. |
| 2006/0066926 A1 | 3/2006 | Kwak et al. |
| 2006/0066935 A1 | 3/2006 | Cummings et al. |
| 2006/0067643 A1 | 3/2006 | Chui |
| 2006/0077155 A1 | 4/2006 | Chui et al. |
| 2006/0077507 A1 | 4/2006 | Chui et al. |
| 2006/0077508 A1 | 4/2006 | Chui et al. |
| 2006/0077515 A1 | 4/2006 | Cummings |
| 2006/0077516 A1 | 4/2006 | Kothari |
| 2006/0079048 A1 | 4/2006 | Sampsell |
| 2006/0082863 A1 | 4/2006 | Piehl et al. |
| 2006/0139723 A9 | 6/2006 | Miles |
| 2006/0220160 A1 | 10/2006 | Miles |
| 2006/0262126 A1 | 11/2006 | Miles |
| 2006/0262380 A1 | 11/2006 | Miles |
| 2006/0268388 A1 | 11/2006 | Miles |
| 2006/0274074 A1 | 12/2006 | Miles |
| 2007/0020948 A1 | 1/2007 | Piehl et al. |
| 2007/0153860 A1 | 7/2007 | Chang-Hasnain et al. |
| 2007/0177247 A1 | 8/2007 | Miles |
| 2007/0253054 A1 | 11/2007 | Miles |
| 2008/0037093 A1 | 2/2008 | Miles |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0106782 A1 | 5/2008 | Miles |
| 2008/0297880 A1 | 12/2008 | Steckl et al. |
| 2009/0068781 A1 | 3/2009 | Tung et al. |
| 2009/0080060 A1 | 3/2009 | Sampsell et al. |
| 2010/0039370 A1 | 2/2010 | Miles |
| 2011/0019380 A1 | 1/2011 | Miles |
| 2011/0026096 A1 | 2/2011 | Miles |
| 2011/0038027 A1 | 2/2011 | Miles |

FOREIGN PATENT DOCUMENTS

| | | |
|---|---|---|
| DE | 10228946 A1 | 1/2004 |
| EP | 0310176 A2 | 4/1989 |
| EP | 0 361 981 | 4/1990 |
| EP | 0 667 548 A1 | 8/1995 |
| EP | 0 668 490 | 8/1995 |
| EP | 0 695 959 | 2/1996 |
| EP | 0788005 | 8/1997 |
| EP | 0 879 991 | 11/1998 |
| EP | 0 969 306 | 1/2000 |
| EP | 0 986 077 | 3/2000 |
| EP | 1 122 577 | 8/2001 |
| EP | 1 205 782 | 5/2002 |
| EP | 1 227 346 | 7/2002 |
| EP | 1275997 | 1/2003 |
| EP | 1 403 212 | 3/2004 |
| EP | 1435336 | 7/2004 |
| EP | 1473581 A2 | 11/2004 |
| EP | 1473691 A2 | 11/2004 |
| EP | 1484635 | 12/2004 |
| FR | 2824643 A | 11/2002 |
| JP | 56-088111 | 7/1981 |
| JP | 62 082454 | 4/1987 |
| JP | 5-49238 | 2/1993 |
| JP | 5-281479 | 10/1993 |
| JP | 05275401 A1 | 10/1993 |
| JP | 08-051230 | 2/1996 |
| JP | 9-127439 | 5/1997 |
| JP | 11211999 | 8/1999 |
| JP | 11211999 A | 11/1999 |
| JP | 2000 147262 | 5/2000 |
| JP | 2000306515 A | 11/2000 |
| JP | 2001-221913 | 8/2001 |
| JP | 2001 249283 | 9/2001 |
| JP | 2002-062490 | 2/2002 |
| JP | 2002-221678 | 8/2002 |
| JP | 2002277771 A | 9/2002 |
| JP | 2003-340795 | 2/2003 |
| JP | 2003 177336 | 6/2003 |
| JP | 2003-195201 | 7/2003 |
| JP | 2003195201 A | 7/2003 |
| JP | 2004-012642 | 1/2004 |
| JP | 2004157527 A | 6/2004 |
| JP | 2004-212638 | 7/2004 |
| JP | 2004-212680 | 7/2004 |
| JP | 2004235465 A | 8/2004 |
| JP | 2004286825 A | 10/2004 |
| JP | 2005 279831 | 10/2005 |
| JP | 2005-308871 | 11/2005 |
| JP | 2007 027150 | 2/2007 |
| TW | 157313 | 5/1991 |
| WO | WO9530924 | 11/1995 |
| WO | WO9717628 | 5/1997 |
| WO | WO 98/14804 | 4/1998 |
| WO | WO9952006 A2 | 10/1999 |
| WO | WO9952006 A3 | 10/1999 |
| WO | WO 02/24570 | 3/2002 |
| WO | WO 02/079853 | 10/2002 |
| WO | WO 02/086582 | 10/2002 |
| WO | WO03007049 A1 | 1/2003 |
| WO | WO 03/014789 A2 | 2/2003 |
| WO | 03/054925 A | 7/2003 |
| WO | WO 03/054925 | 7/2003 |
| WO | 03069413 A | 8/2003 |
| WO | WO 03/069404 | 8/2003 |
| WO | WO03069413 A1 | 8/2003 |
| WO | WO03073151 A1 | 9/2003 |
| WO | WO 03/085728 A1 | 10/2003 |
| WO | WO 03/105198 | 12/2003 |
| WO | WO2004006003 A1 | 1/2004 |
| WO | WO2004026757 A2 | 4/2004 |
| WO | WO 2005/006364 A1 | 1/2005 |
| WO | WO 2006/014929 | 2/2006 |

OTHER PUBLICATIONS

Official Communication dated Oct. 16, 2007 in European App. No. 05790217.3.
ISR and WO for PCT/US05/029899 filed Aug. 22, 2005.
U.S. Appl. No. 11/045,800, filed Jan. 28, 2005, Miles et al.
Chiou et al., "A Novel Capacitance Control Design of Tunable Capacitor Using Multiple Electrostatic Driving Electrodes," IEEE NANO 2001, M 3.1, Nanoelectronics and Giga-Scale Systems (Special Session), pp. 319-324, published Oct. 28, 2001.
Goossen, "MEMS-based variable optical interference devices," Optical Mems, 2000 IEEE/LEDS Int'l. Conf., Piscatawny, NJ, Aug. 21, 2000, pp. 17-18, published Aug. 21, 2000.
Jerman et al., "Miniature Fabry-Perot Interferometers Micromachined in Silicon for Use in Optical Fiber WDM Systems,"

Transducers, San Francisco, Jun. 24-27, 1991, Proceedings on the Int'l. Conf. On Solid State Sensors and Actuators, vol. CONF. 6, Jun. 24, 1991, pp. 372-375.

Peerlings et al., "Long Resonator Micromachined Tunable GaAs-AlAs Fabry-Perot Filter," IEEE Photonics Technology Letters, IEEE Service Center, Piscatawny, NJ, vol. 9, No. 9, Sep. 1997, pp. 1235-1237.

Wu et al., "MEMS Designed for Tunable Capacitors," Microwave Symposium Digest, 1998 IEEE MTT-S Int'l., Baltimore, MD, vol. 1, pp. 127-129, published Jun. 7, 1998.

Butler et al., "An Embedded Overlay Concept for Microsystems Packaging," IEEE Transactions on Advanced Packaging IEEE USA, vol. 23, No. 4, pp. 617-622, XP002379648 (2000).

Chunjun Wang et al., "Flexible curcuit-based RF MEMS Switches," MEMS. XP002379649 pp. 757-762, (Nov. 2001).

Joannopoulos et al., "Molding the Flow of Light," Photonic Crystals. 1995.

Nagami et al., "Plastic Cell Architecture: Towards Reconfigurable Computing for General-Purpose," Proc. IEEE Workshop on FPGA-based Custom Computing Machines, (1998).

Zhou et al., "Waveguide Panel Display Using Electromechanical Spatial Modulators," SID Digest, vol. XXIX, 1998.

International Search Report and Written Opinion of the International Searching Authority for PCT/US2005/005919 dated Aug. 24, 2005.

International Search Report Application No. PCT/US2005/026448, Dated Nov. 23, 2005.

International Search Report Application No. PCT/US2005/029820, Dated Dec. 27, 2005.

International Search Report Application No. PCT/US2005/030962, Dated Aug. 31, 2005.

International Search Report Application No. PCT/US2005/034465, Dated Sep. 23, 2005.

European Search Report Application No. 05255693.3-2217, dated May 24, 2006.

European Search Report Application No. EP 05 25 5673 in 9 pages, dated Jan. 23, 2006.

Austrian Search Report No. 162/2005, Dated Jul. 14, 2005.
Austrian Search Report No. 164/2005, Dated Jul. 4, 2005.
Austrian Search Report No. 140/2005, Dated Jul. 15, 2005.
Austrian Search Report No. 161/2005, Dated Jul. 15, 2005.
Austrian Search Report No. 150/2005, Dated Jul. 29, 2005.
Austrian Search Report No. 144/2005, Dated Aug. 11, 2005.
Austrian Search Report No. 66/2005, Dated May 9, 2005.
IPRP for PCT/US05/029899 filed Aug. 22, 2005.

Fan et al., Channel Drop Filters in Photonic Crystals, Optics Express, vol. 3, No. 1, 1998.

Fork, et al., "P-67: Chip on Glass Bonding using StressedMetal™ Technology" Sid 05 Digest, May 24, 2005.

Kim et al., "Control of Optical Transmission Through metals Perforated With Subwave-Length Hole Arrays," Optic Letters, vol. 24, No. 4, Feb. 15, 1999, pp. 256-257.

Lin et al., "Free-Space Michromachined Optical Switches for Optical Networking," IEEE Journal of Selected Topics in Quantum Electronics, vol. 5, No. 1m Jan./Feb. 1999, pp. 4-9.

Little et al., "Vertically Coupled Microring Resonator Channel Dropping Filter," IEEE Photonics Technology Letters, vol. 11, No. 2, 1999.

Magel, "Integrated Optic Devices Using Micromachined Metal Membranes," SPIE vol. 2686, 0-8194-2060-3/1996.

Science and Technology, The Economist, May 22, 1999, pp. 89-90.

Akasaka, "Three-Dimensional IC Trends", Proceedings of IEEE, vol. 74, No. 12, pp. 1703-1714, (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Bass, "Handbook of Optics, vol. I, Fundamentals, Techniques, and Design, Second Edition," McGraw-Hill, Inc., New York, pp. 2.29-2.36 (1995).

Conner, "Hybrid Color Display Using Optical Interference Filter Array," SID Digest, pp. 577-580 (1993).

Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics pp. 78-80 (Feb. 5, 1987).

Howard et al., "Nanometer-Scale Fabrication Techniques", VLSI Electronics: Microstructure Science, vol. 5, pp. 145-153 and pp. 166-173 (1982).

Ibbotson et al., "Comparison of XeF2 and F-atom reactions with Si and SiO2," Applied Physics Letters, vol. 44, No. 12, pp. 1129-1131 (Jun. 1984).

Jackson "Classical Electrodynamics", John Wiley & Sons Inc., pp. 568-573. (date unknown).

Jerman et al., "A Miniature Fabry-Perot Interferometer with a Corrugated Silicon Diaphragm Support", (1988).

Johnson "Optical Scanners", Microwave Scanning Antennas, vol. 1, p. 251-261, (1964).

Light over Matter, Circle No. 36 (Jun. 1993).

Miles, Mark, W., "A New Reflective FPDTechnology Using Interferometric Modulation", The Proceedings of the Society for Information Display (May 11-16, 1997).

Newsbreaks, "Quantum-trench devices might operate at terahertz frequencies", Laser Focus World (May 1993).

Oliner et al., "Radiating Elements and Mutual Coupling", Microwave Scanning Antennas, vol. 2, pp. 131-141, (1966).

Raley et al., "A Fabry-Perot Microinterferometer for Visible Wavelengths", IEEE Solid-State Sensor and Actuator Workshop, Jun. 1992, Hilton Head, SC.

Schnakenberg, et al. TMAHW Etchants for Silicon Micromachining. 1991 International Conference on Solid State Sensors and Actuators-Digest of Technical Papers. pp. 815-818.

Sperger et al., "High Performance Patterned All-Dielectric Interference Colour Filter for Display Applications", SID Digest, pp. 81-83, (1994).

Stone, "Radiation and Optics, An Introduction to the Classical Theory", McGraw-Hill, pp. 340-343, (1963).

Walker, et al., "Electron-beam-tunable Interference Filter Spatial Light Modulator", Optics Letters vol. 13, No. 5, pp. 345-347, (May 1988).

Williams, et al. Etch Rates for Micromachining Processing. Journal of Microelectromechanical Systems, vol. 5, No. 4, pp. 256-259, (Dec. 1996).

Winters, et al. The etching of silicon with XeF2 vapor. Applied Physics Letters, vol. 34, No. 1, pp. 70-73, (Jan. 1979).

Winton, John M., "A novel way to capture solar energy", Chemical Week, (May 1985).

Wu, "Design of a Reflective Color LCD Using Optical Interference Reflectors", ASIA Display '95, pp. 929-931, (Oct. 1995).

Pape et al., Characteristics of the deformable mirror device for optical information processing, Optical Engineering, 22(6):676-681, Nov.-Dec. 1983.

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays; Proceedings of SPIE, vol. 4985, pp. 131-139, 2003.

Longhurst, 1963, Chapter IX: Multiple Beam Interferometry, in Geometrical and Physical Optics, pp. 153-157.

Tolansky, 1948, Chapter II: Multiple-Beam Interference, in Multiple-bean Interferometry of Surfaces and Films, Oxford at the Clarendon Press, pp. 8-11.

Nakagawa et al., Feb. 1, 2002, Wide-field-of-view narrow-band spectral filters based on photonic crystal nanocavities, Optics Letters, 27(3):191-193.

Billard, Tunable Capacitor, 5th Annual Review of LETI, Jun. 24, 2003, p. 7.

Hohlfeld et al., Jun. 2003, Micro-machined tunable optical filters with optimized band-pass spectrum, 12th International Conference on Transducers, Solid-State Sensors, Actuators and Microsystems, 2:1494-1497.

Mehregany et al., 1996, MEMS applications in optical systems, IEEE/LEOS1996 Summer Topical Meetings, pp. 75-76.

Miles et al, Oct. 21, 1997, A MEMS based interferometric modulator (IMOD) for display applications, Proceedings of Sensors Expo, pp. 281-284.

Nieminen et al., 2004, Design of a temperature-stable RF MEM capacitor, IEEE Journal of Microelectromechanical Systems, 13(5):705-714.

Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.

* cited by examiner

|  | Column Output Signals | |
|---|---|---|
|  | $+V_{bias}$ | $-V_{bias}$ |
| Row Output Signals: 0 | Stable | Stable |
| $+\Delta V$ | Release | Actuate |
| $-\Delta V$ | Actuate | Release |

ANALOG INTERFEROMETRIC MODULATOR DEVICE

RELATED APPLICATION

This application claims the benefit of the earlier filing date of U.S. Provisional Application No. 60/613,465 filed Sep. 27, 2004, which is hereby incorporated herein by reference in its entirety.

BACKGROUND

1. Field

The invention relates to micro-electromechanical system devices. More particularly, the invention relates to analog and digital electronic and/or optical devices utilizing a micro-electromechanical system.

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

One aspect of the invention provides a microelectromechanical system (MEMS) device. The device comprises a first electrode layer, a second electrode layer, a support structure which separates the first electrode layer from the second electrode layer, and a reflective element located and movable between a first position and a second position. The first and second positions are located between the first and second electrode layers. The reflective element is spaced from the support structure. The reflective element comprises a reflective layer and a conductive portion, which is electrically insulated from the first electrode layer and the second electrode layer. Further, the reflective element is responsive to voltages applied to the first electrode layer, the second electrode layer, and the conductive portion by moving between the first position and the second position.

Another aspect of the invention provides a method of making a MEMS device. According to this method, a partially reflective layer is provided and a first sacrificial layer is formed over the partially reflective layer. A reflective material layer is deposited over the first sacrificial layer, and a portion of the reflective material layer is selectively etched to form a mirror. Then, a second sacrificial layer is formed over the first sacrificial layer and the mirror. A mechanical layer is deposited over the second sacrificial layer, and an opening is formed through the mechanical layer and the second sacrificial layer to expose a portion of the mirror through the second sacrificial layer. Then, the opening is filled with a conductive material to form a conductive connection to the mirror. A portion of the mechanical layer surrounding the conductive connection is selectively etched to electrically insulate the conductive connection from the mechanical layer. Thereafter, the first and second sacrificial layers are removed to form cavities in the MEMS device.

Still another aspect of the invention provides a method of operating a MEMS device. The method comprises providing a MEMS device, which comprises a first electrode layer, a second electrode layer, a support structure which separates the first electrode layer from the second electrode layer, and a reflective element located and movable between a first position and a second position. The first and second positions are located between the first and second electrode layers. The reflective element is spaced apart from the support structure. The reflective element comprises a conductive portion electrically insulated from the first electrode layer and the second electrode layer. Further, the reflective element is responsive to voltages applied to the first electrode layer, the second electrode layer, and the conductive portion by moving between the first position and the second position. According to the method, a first voltage difference is applied between the first electrode layer and the conductive portion, thereby moving the reflective element between the first position and a third position which is located between the first and second positions. Further, a second voltage difference is applied between the first electrode layer and the conductive portion while applying a non-zero voltage difference between the second electrode layer and the conductive portion, thereby moving the reflective element between the third position and the second position.

A further aspect of the invention provides a method of operating a MEMS device. The method comprises providing a MEMS device, which comprises a first electrode layer, a second electrode layer, a support structure which separates the first electrode layer from the second electrode layer, and a reflective element located and movable between a first position and a second position. The first and second positions are located between the first and second electrode layers. The reflective element is spaced from the support structure. The reflective element comprises a conductive portion electrically insulated from the first electrode layer and the second electrode layer. Further, the reflective element is responsive to voltages applied to the first electrode layer, the second electrode layer, and the conductive portion by moving between the first position and the second position. According to the method, a first voltage difference is applied between the first electrode layer and the conductive portion, the first voltage difference less than a threshold voltage, beyond which the reflective element moves to the second position. Further, a second voltage difference is applied between the first electrode layer and the conductive portion, the second voltage difference greater than the threshold voltage while applying a non-zero voltage difference between the second electrode layer and the conductive portion.

DETAILED DESCRIPTION OF EMBODIMENTS

Figure 1:
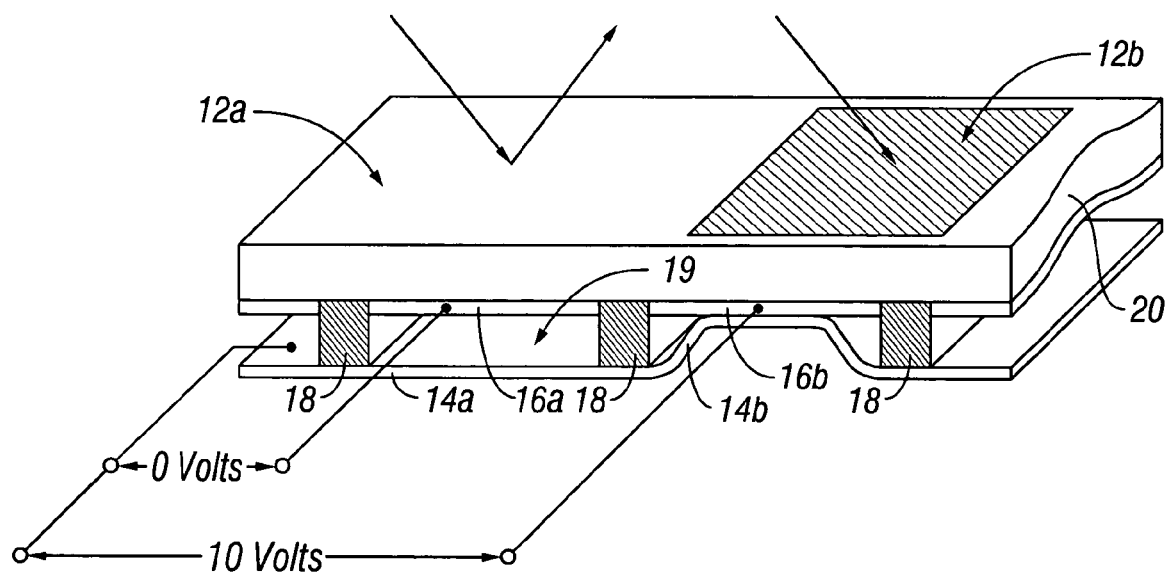
FIG. 1 is an isometric view depicting a portion of one embodiment of an interferometric modulator display in which a movable reflective layer of a first interferometric modulator is in a released position and a movable reflective layer of a second interferometric modulator is in an actuated position.

Various embodiments of the invention will be discussed in more detail below, with reference to the drawings, wherein like elements are generally referred to with like numerals throughout. The sizes and shapes of elements shown in the drawings do not represent actual sizes or shapes, nor represent relative sizes of the elements shown in a single drawing.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry).

Embodiments of the invention provide an analog MEMS device that is tunable substantially throughout a range of linear movement of an electrode within an interferometric cavity. The analog MEMS device may be used as a reflective display element tunable to any colored visible light or tunable to any wavelength of light, including radio frequency. The analog MEMS device may be used as a completely tunable capacitor.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a relaxed position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers 14a, 14b are separated from the fixed metal layers by a defined gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
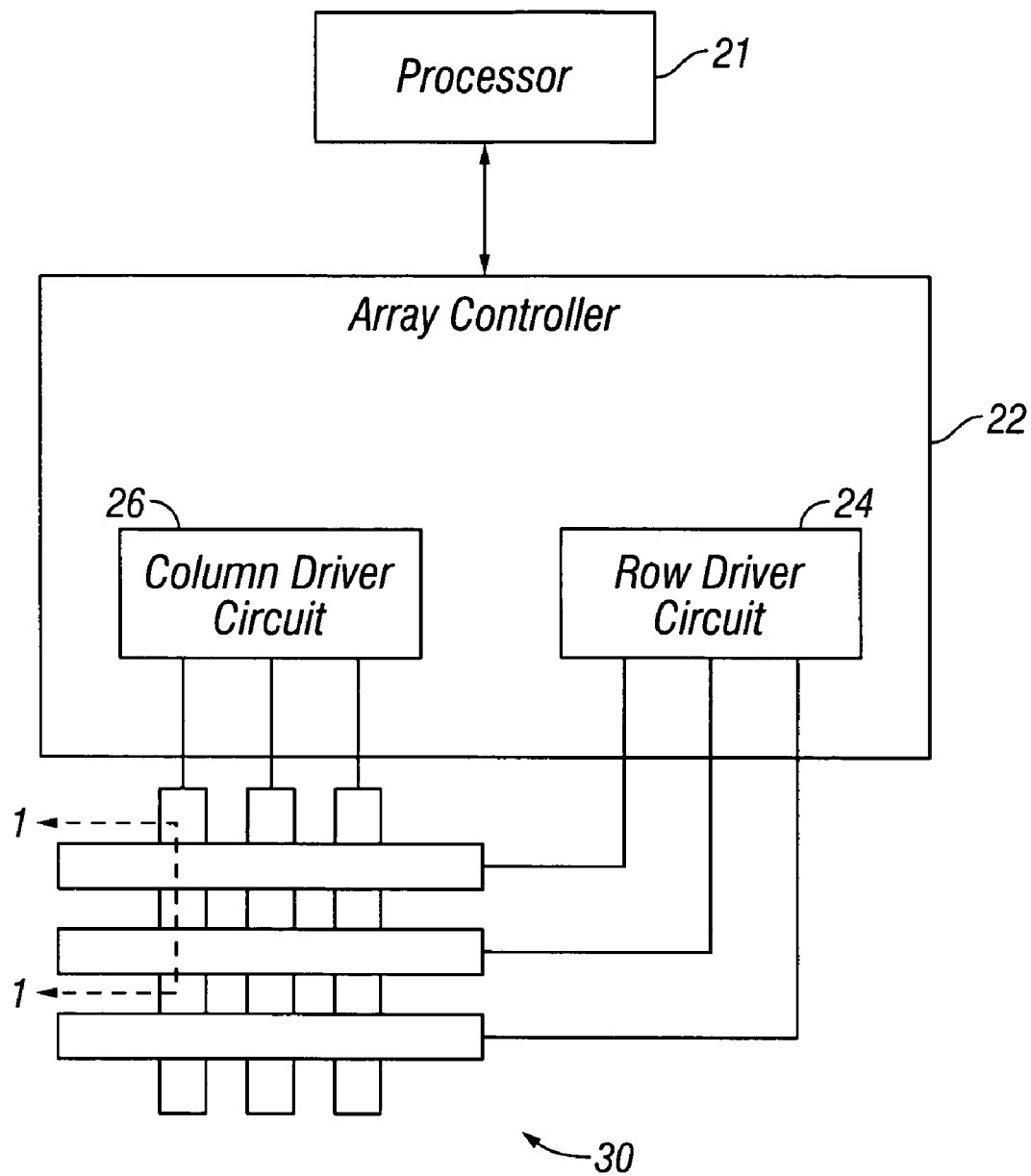
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
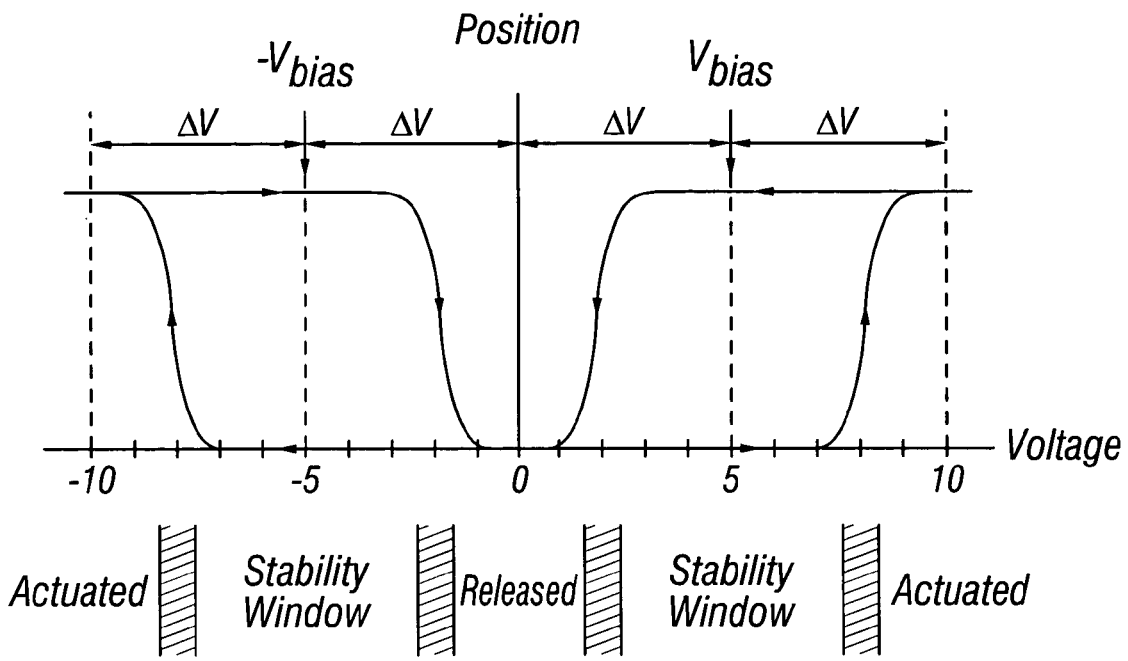
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
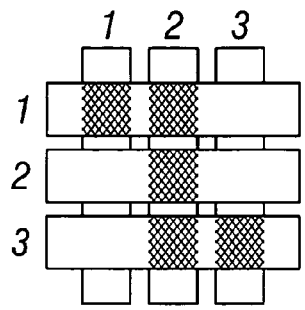
FIGS. 5A and 5B illustrate one exemplary timing diagram for row and column signals that may be used to write a frame of display data to the 3×3 interferometric modulator display of FIG. 2.
Figure 5B:
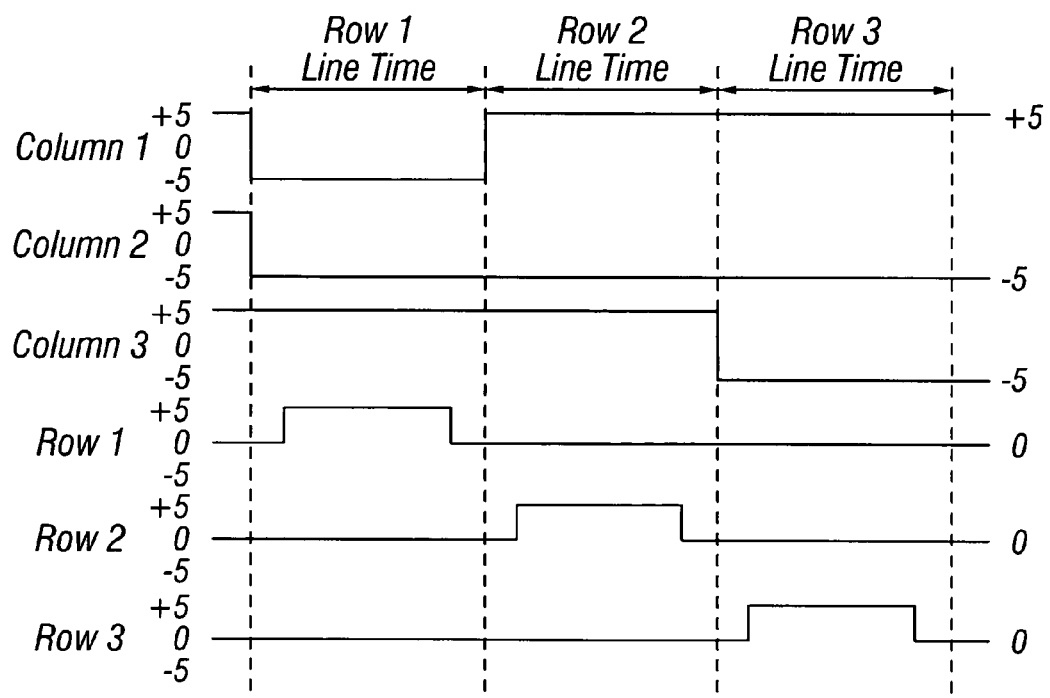

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
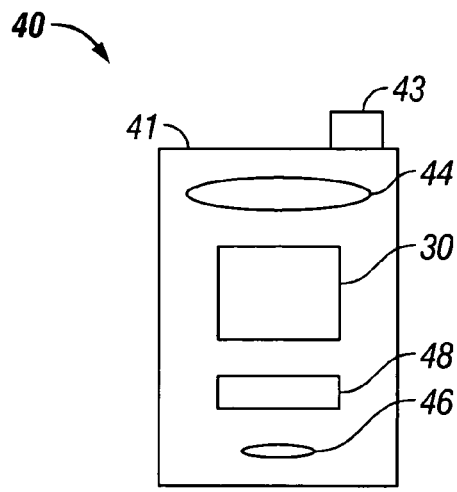
FIGS. 6A and 6B are system block diagrams illustrating an embodiment of a display device.
Figure 6B:
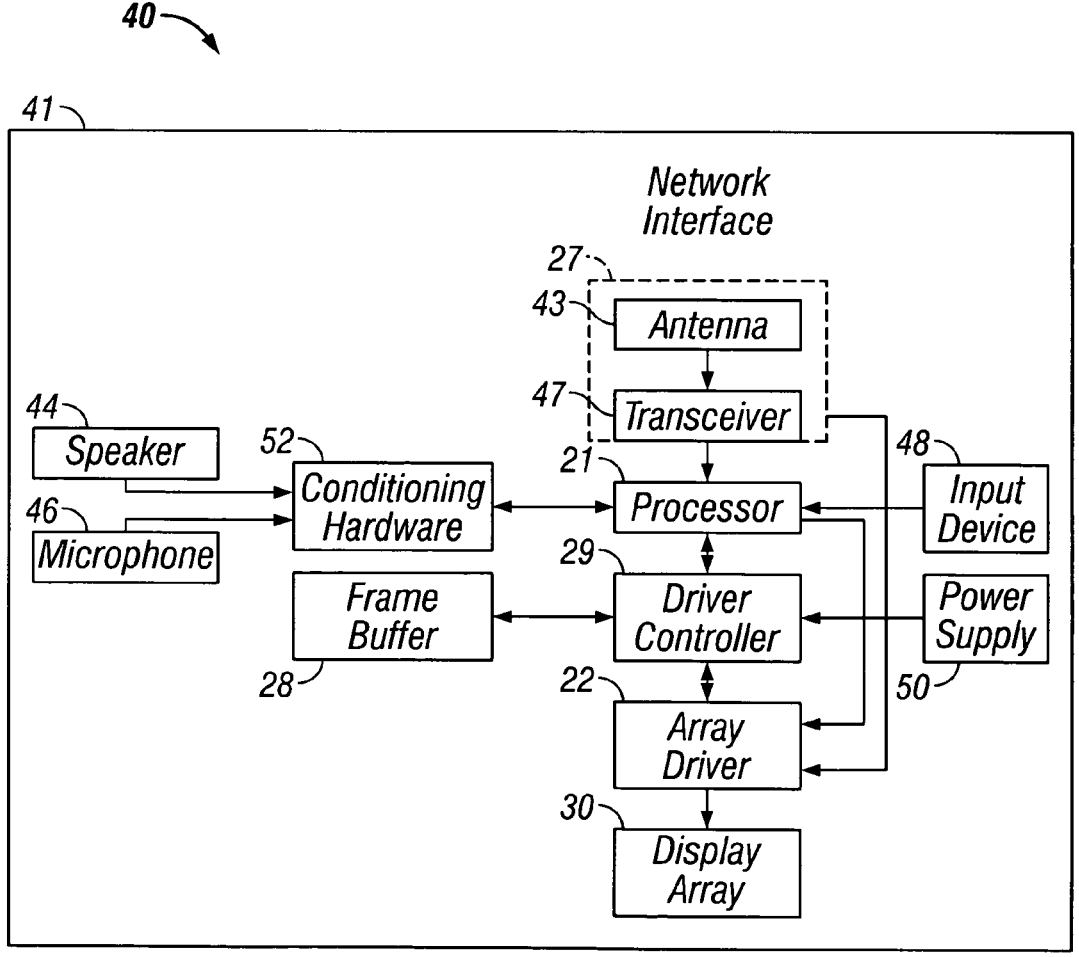

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 44 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 44, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will, recognize that the above-described optimization may be implemented in any number of hardware and/or software components and in various configurations.

Figure 7A:
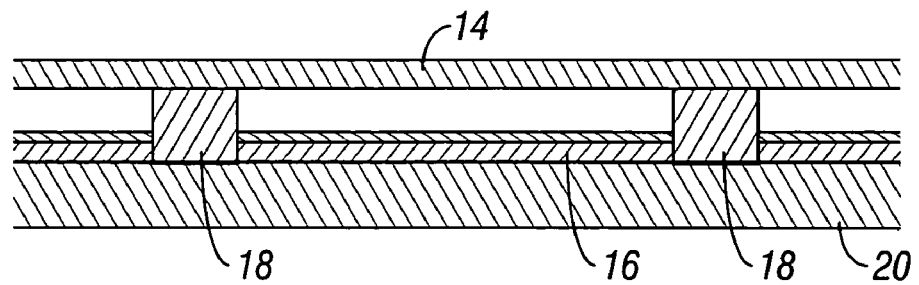
FIG. 7A is a cross section of the device of FIG. 1.
Figure 7B:
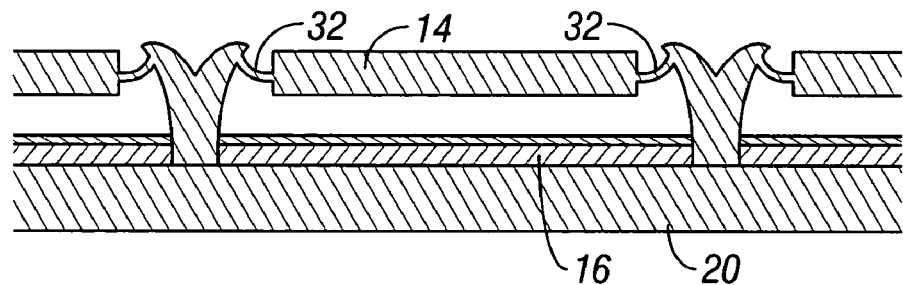
FIG. 7B is a cross section of an alternative embodiment of an interferometric modulator.
Figure 7C:
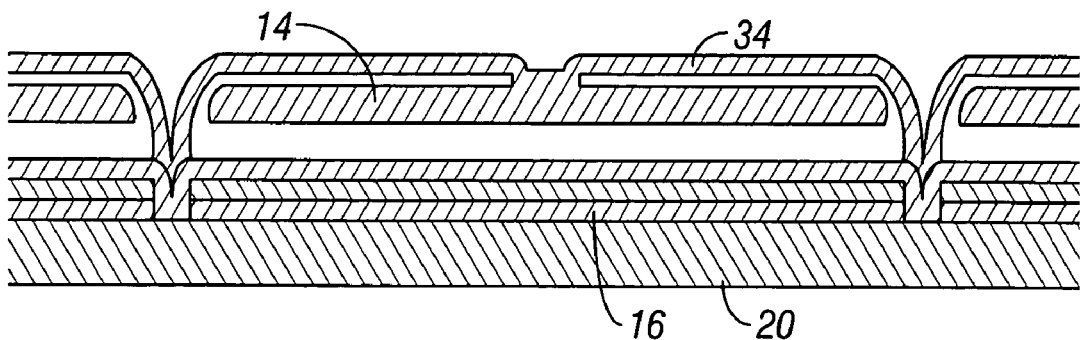
FIG. 7C is a cross section of another alternative embodiment of an interferometric modulator.

The details of the structure of interferometric modulators that operate in accordance with the principles set forth above may vary widely. For example, FIGS. 7A-7C illustrate three different embodiments of the moving mirror structure. FIG. 7A is a cross section of the embodiment of FIG. 1, where a strip of metal material 14 is deposited on orthogonally extending supports 18. In FIG. 7B, the moveable reflective material 14 is attached to supports at the corners only, on tethers 32. In FIG. 7C, the moveable reflective material 14 is suspended from a deformable layer or mechanical layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of known techniques may be used to produce the above described structures involving a series of material deposition, patterning, and etching steps.

First MEMS Architecture

Figure 8A:
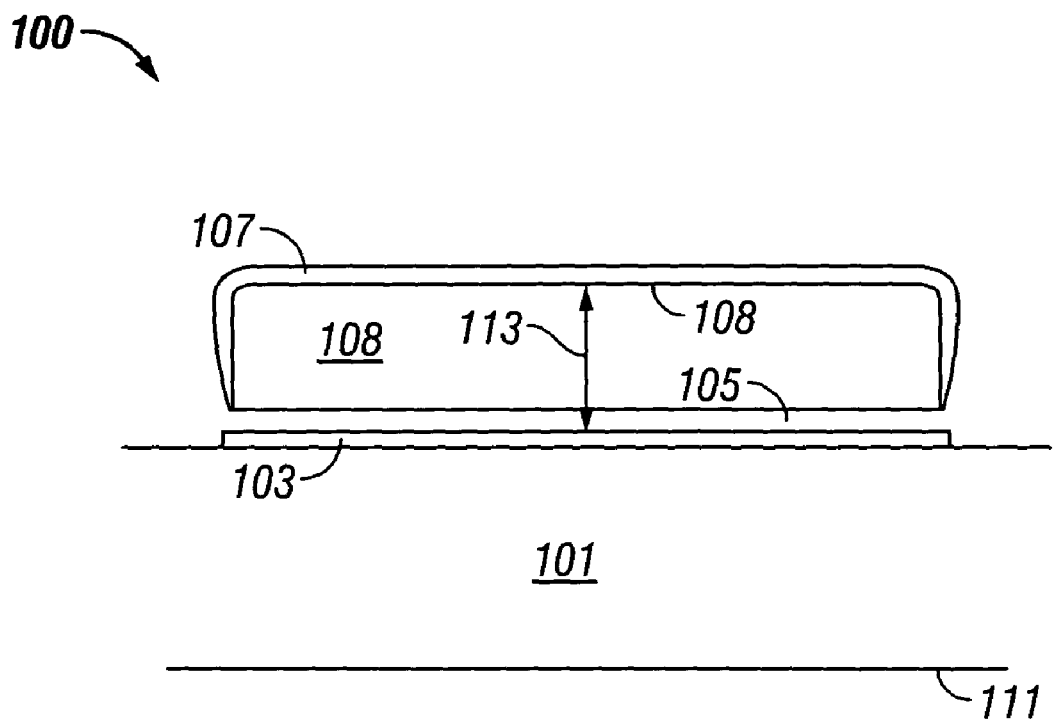
FIGS. 8A and 8B are side cross-sectional views illustrating configurations of one embodiment of a MEMS device.

FIG. 8A illustrates an embodiment of a MEMS device 100 in a side cross-sectional view. The MEMS device 100 is constructed on a substrate 101 made in one embodiment of glass although not limited thereto. An optical layer 103 is formed on the substrate 101. The optical layer 103 acts as a partial mirror as it both reflects and transmits some of the incident light. In one embodiment, the optical layer 103 may be conductive and may be patterned into rows (not illustrated). In one embodiment, a dielectric layer 105 may be formed over the optical layer 103. A mechanical layer 107 is located such that one of its surfaces faces the dielectric layer 105 in a substantially parallel plane and spaced relationship. The dielectric layer 105 prevents electrical shortage of the optical layer 103 and mechanical layer 107 in a driven state, which will be described below, and further protects the two layers 103 and 107 from damage by impact when the mechanical layer is driven to contact the optical layer 103.

In one embodiment, the surface 108 of the mechanical layer 107 opposing the dielectric layer 105 is highly reflective and acts as a mirror. The reflective surface 108 of the mechanical layer is referred to as the "mirror surface". Also, the mechanical layer 107 may be conductive and patterned into columns (not illustrated). A physical cavity 109 is created between the dielectric layer 105 and the mechanical layer 107. The cavity 109 is often referred to as an "interferometric cavity" although a depth 113 of the interferometric cavity is defined between the mechanical layer 107 and the optical layer 103 rather than the dielectric layer 105. One of ordinary skill in the art will appreciate processes for manufacturing of the MEMS device 100 and an array thereof, which is a two-dimensional arrangement of a plurality of the MEMS devices 100 (not illustrated).

The MEMS device 100 is operated by applying or not applying an electric potential between the optical layer 103 and the mechanical layer 107. In FIG. 8A, the MEMS device 100 is illustrated in the configuration produced when no voltage is applied between the optical layer 103 and mechanical layer 107, which is referred to as an "undriven state" or "undriven configuration". In this state, light that is incident on the MEMS device 100 through the substrate 101 is interferometrically modulated, which will be well appreciated by one of ordinary skill in the art. Depending on the interferometric cavity depth 113, a certain wavelength of the light is reflected to the viewer. If the selected wavelength of the light is visible, a colored light corresponding to the wavelength is displayed.

Figure 8B:
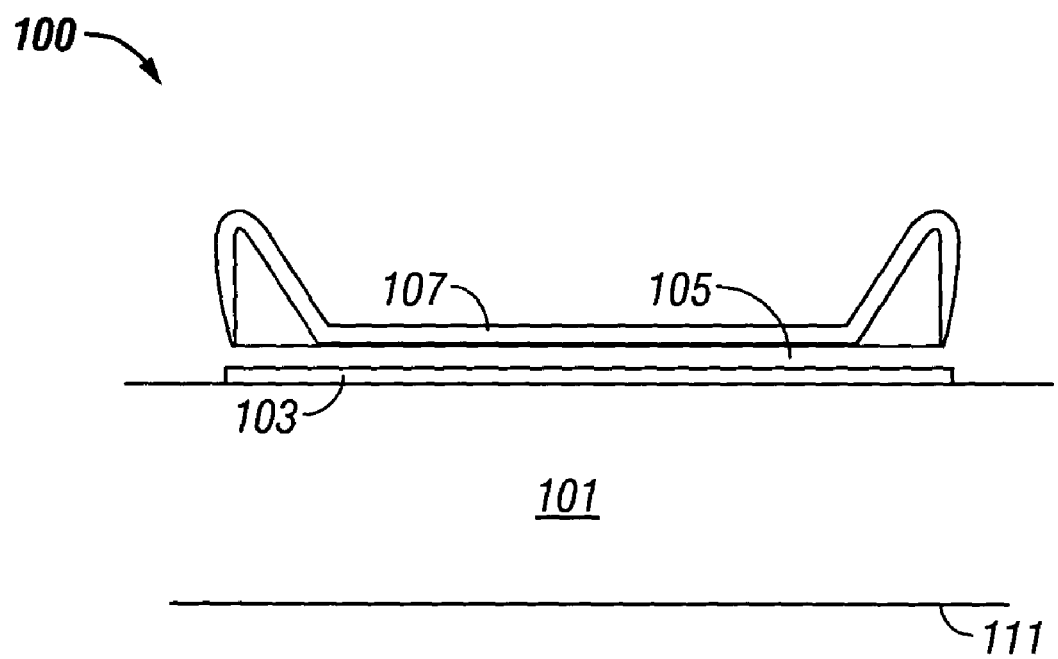

On the other hand, by applying a voltage between the optical layer 103 and the mechanical layer 107, which is generally greater than a drive threshold voltage, the mechanical layer 107 is driven to deform and contact the dielectric layer 105, as illustrated in FIG. 8B. This configuration of the MEMS device 100 is referred to as a "driven state" or "driven configuration". In this driven state, the MEMS device 100 is in an induced absorption mode, in which most of the light incident on the substrate 101 is absorbed with the result that the surface 111 of the substrate 100 appears black to the viewer. Generally, the other MEMS devices disclosed herein and their variants will operate in the same or similar ways, unless specifically discussed otherwise. In another configuration, the "driven state" could also result in an interferometric color reflection depending on the thickness of the dielectric layer 105.

Second MEMS Architecture

Figure 8C:
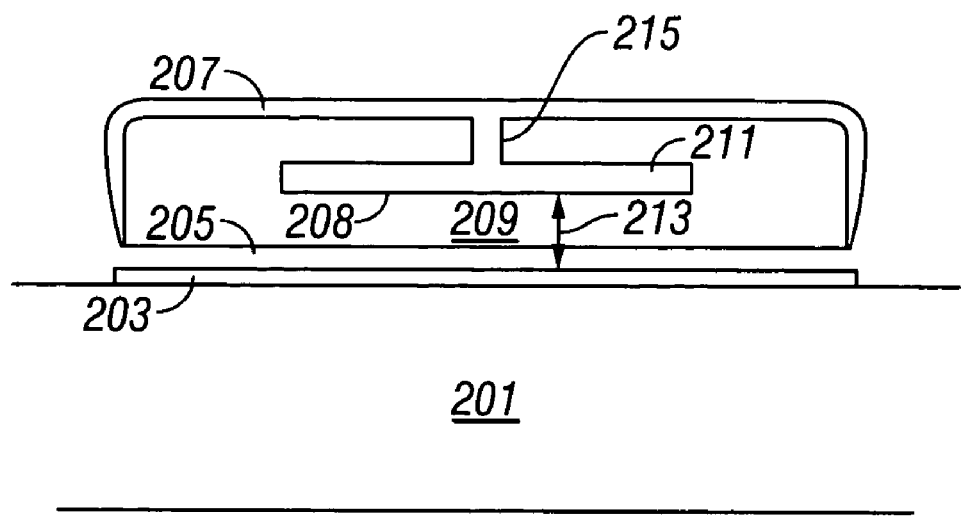
FIGS. 8C and 8D are side cross-sectional views illustrating configurations of another embodiment of a MEMS device.
Figure 8D:
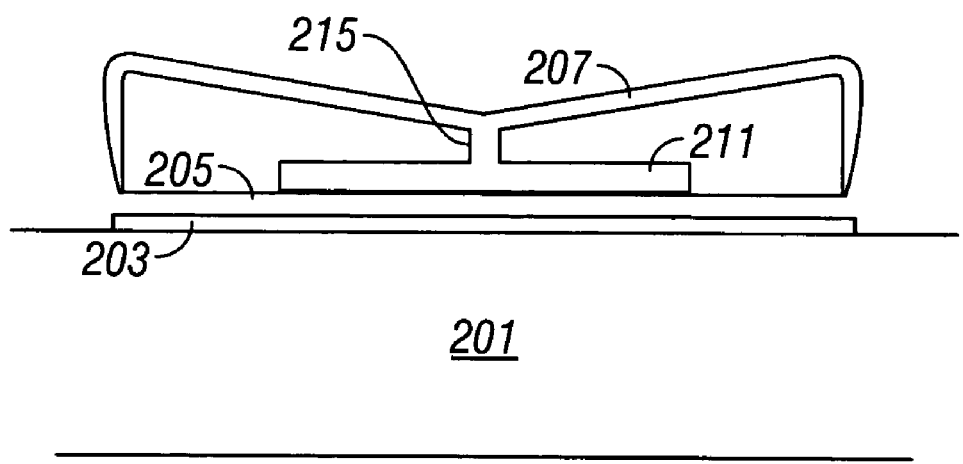

FIGS. 8C and 8D illustrate another embodiment of a MEMS device 200. As illustrated, the MEMS device 200 is constructed on a substrate 201 and comprises an optical layer 203, dielectric layer 205 and a mechanical layer 207. The substrate 201, optical layer 203 and dielectric layer 205 have generally the same characteristics and features as the respective layers 101, 103 and 105 of the MEMS device 100, unless specifically stated otherwise. In the MEMS device 200, a mirror 211 is provided between the mechanical layer 207 and the dielectric layer 203. The mirror 211 has a highly reflective surface 208 and is electrically conductive. As illustrated, the mirror 211 of the MEMS device 200 is mechanically and electrically connected to the mechanical layer 207 via a connection 215. Unlike the mechanical layer 107 of FIGS. 8A and 8B, the mechanical layer 207 does not have to have a reflective surface. Thus, in the MEMS device 200, the mechanical layer 207 is dedicated to the function of mechanical movement by deformation, and the mirror 211 is dedicated to the function of a mirror as an optical element. One of ordinary skill in the art will appreciate processes available for manufacturing the MEMS device 200 and an array thereof comprising a plurality of MEMS devices 200 arranged on a plane.

An interferometric cavity 209 is formed between the mirror surface 208 and the dielectric layer 205. The depth of the cavity 213 is the distance between the mirror surface 208 and the optical layer 203 (not the dielectric layer 205). In FIG. 8C, the MEMS device 200 is illustrated in the configuration of its undriven state, where no voltage is applied between the optical layer 203 and the mechanical layer 207 (or the mirror 211). In FIG. 8D, on the other hand, the MEMS device 200 is in its driven state, where a voltage greater than a threshold voltage is applied between the optical layer 203 and the mechanical layer 207 (or the mirror 211). As illustrated, the mechanical layer 207 deforms and the reflective surface 408 of the mirror (hereinafter "mirror surface" 208) contacts the dielectric layer 205.

Limited Tuning of the First and Second MEMS Architectures

Figure 9:
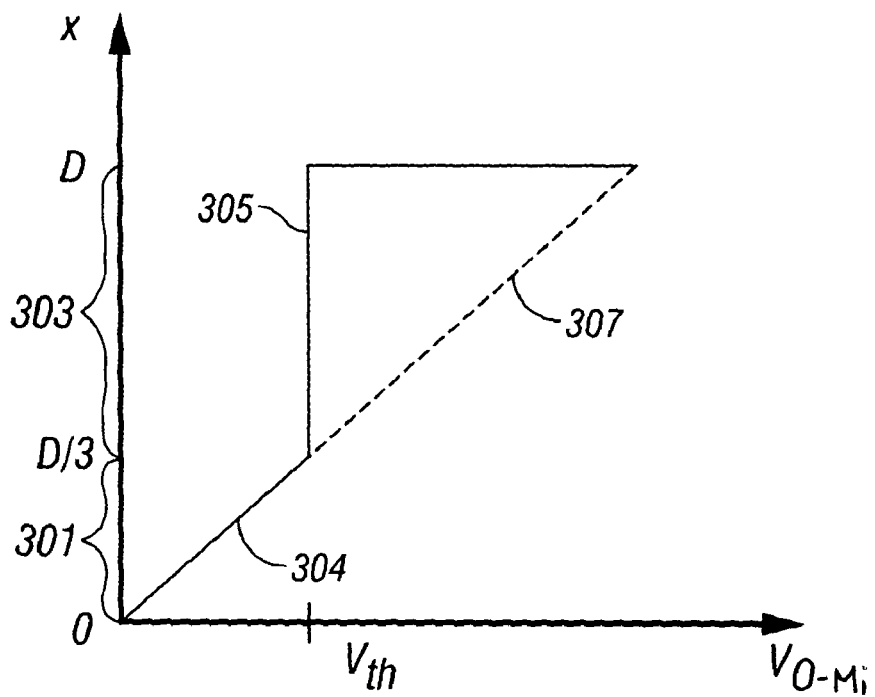
FIG. 9 is a graph illustrating the mirror's position in response to voltages applied between two electrodes of the MEMS devices of FIGS. 8A-8D.

FIG. 9 illustrates the relationship between the movement of the mirror surface 108/208 of an interferometric modulator and the electric potential difference between the optical layer 103/203 and the mirror surface 108/208 of the interfeometric modulator. The horizontal axis represents the voltage ($V_{O-Mi}$), which is the difference between the voltage ($V_O$) of the optical layer 103/203 and the voltage ($V_{Mi}$) of the mirror surface 108/208. The voltage applied to the mirror surface 108/208 is the same (equipotential) as that of the mechanical layer 107/207 as they are electrically connected. The vertical axis represents the movement or displacement (x) of the mirror surface 108/208 from its position in its undriven state in the direction toward the optical layer 103/203 and substantially perpendicular to the mirror surface 108/208 in its undriven state.

When no voltage is applied between the optical layer 103/203 and the mechanical layer 107/207, the MEMS device is in its undriven state and the mirror surface does not move (x=0). When a voltage is applied between the optical layer 103/203 and mechanical layer 107/207, the mechanical layer 107/207 is driven to deform, and accordingly the mirror surface 108/208 moves toward the optical layer 103/203. The displacement 304 of the mirror surface 108/208 is substantially proportional to the increase or decrease of the voltage difference ($V_{O-Mi}$) until it reaches a threshold voltage ($V_{th}$). When the voltage difference ($V_{O-Mi}$) reaches the threshold voltage ($V_{th}$), a small increase of the voltage difference will make a sudden deformation of the mechanical layer 107/207, resulting in the sudden displacement 305 of mirror surface 108/208 toward the dielectric layer 105/205 (x=D). The maximum displacement ($x_{max}$=D) is the distance between the dielectric layer 105/205 and the mirror surface 108/208 in the undriven state (x=0) of the MEMS device 100/200. The maximum displacement (D) is shorter than the maximum depth of the interferometric cavity 113 by the thickness of the dielectric layer 105/205. In some embodiments, for example, the displacement of the mirror surface ($D_{th}$) at the threshold voltage is about one third (⅓) of the maximum displacement (D).

In summary, the mirror surface 108/208 responds to the changes of the voltage difference ($V_{O-Mi}$) from its undriven position up until about one third of the maximum displacement (D). Thus, in a first segment 301 (0≦x≦D/3), the interferometric cavity depth 113/213 of the MEMS device 100/200 is highly tunable by changing the voltage ($V_{O-Mi}$) applied between the optical layers 103/203 and the mechanical layer 107/207. On the other hand, however, the mirror surface 108/208 rapidly moves in reply to a very small change in the voltage difference ($V_{O-Mi}$) when the voltage difference ($V_{O-Mi}$) becomes greater than the threshold voltage ($V_{th}$). Accordingly, in a second segment 303 (D/3≦x≦D), tuning of the interferometric cavity depth 113/213 by changing the voltage difference ($V_{O-Mi}$) is generally difficult to accomplish.

This phenomenon may be explained by equilibrium of forces and counter forces exerted on a moving part although the invention and the embodiments thereof are not bound by any theories. The equilibrium of the forces is now described in more detail with reference to the MEMS device 100 of FIGS. 8A and 8B. In the MEMS device 100, the major forces acting on the mirror surface 108, which is a moving part in question, are 1) an electrostatic force between the optical layer 103 and the mechanical layer 107, and 2) a mechanical restoration force of the mechanical layer 107. The electrostatic force between the optical layer 103 and the mechanical layer 107 is dependent on the potential difference between the two layers 103 and 107. Although the electrostatic force may be created as either attractive or repulsive, it is desirable to have the force maintained as attractive in the operation of the MEMS device 100.

In response to the electrostatic force between the two layers 103 and 107, the mechanical layer 107 (being less rigid than the optical layer 103 in this embodiment) moves towards the optical layer 103. In other embodiments, either or both of the layers 103 and 107 may move toward the other. The electrostatic force is represented by the following equations:

$$F_{eO-Mi} = \frac{d}{dx}\left(\frac{1}{2}CV_{O-Mi}^2\right) \quad \text{Equation 1}$$

$$C_{O-Mi} = \frac{\varepsilon A}{d-x} \quad \text{Equation 2}$$

In the foregoing equations, $F_{eO-Mi}$ represents electrostatic force exerted on the mirror surface 108 caused by the voltage applied between the optical layer 103 and the mirror surface 108. "$C_{O-Mi}$" represents capacitance between two electrodes, which are the optical layer 103 and the mirror surface 108. "$\varepsilon$" is the effective permittivity of the materials placed between two electrodes, which are again the optical layer 103 and the mirror surface 108. In the foregoing equations, "A" is an effective overlapping area of the two opposing electrodes, which is in this case the area of the mirror surface 108. The parameter "d" is a distance between two opposing electrodes, which is in this case the distance 413 between the mirror surface 108 and the optical layer 103 in the undriven configuration as illustrated in FIG. 1. "x" represents a displacement of the mirror surface 108 toward the optical layer 103 from its position in the undriven configuration.

The mechanical restoration force exists in the mechanical layer 107 when it has changed its configuration from its most stable configuration. For example, the mechanical layer 107 is in its most stable configuration when the MEMS device 100 is in the undriven state (x=0). Then, if the MEMS device 100 is in a driven position (x>0), the mechanical restoration force is exerted on the mechanical layer 107 and its mirror surface 108 in the direction away from the optical layer 103 in favor of the undriven configuration. The mechanical restoration force depends on the properties of the material used in the mechanical layer 107 and the geometrical configuration of the mechanical layer 107. One of ordinary skill in the art will appreciate the relationship between the geometrical configuration of the mechanical layer 107 and the restoration force upon selection of an appropriate material for the mechanical layer 107. Also, one of ordinary skill in the art will be able to design the geometrical configuration of the mechanical layer 107 to create a desired size of the restoration force of the mechanical layer upon the selection of an appropriate material.

In the first segment 301 ($0 \leq x \leq D/3$) in FIG. 9, for example, the attractive electrostatic force created by the voltage ($V_{O-Mi}$) applied between the layers 103 and 107 substantially equilibrates with the mechanical restoration force of the mechanical layer 107 at any point of the first segment 301. This is a primary reason why the location of the mirror surface 108 (accordingly, the interferometric cavity depth 113) is tunable by changing the voltage difference ($V_{O-Mi}$). In the second segment 303 ($D/3 \leq x \leq D$), however, the attractive electrostatic force between the optical layer 103 and the mechanical layer 107 is significantly larger than the mechanical restoration force in the opposite direction. Thus, a slight increase of the voltage ($V_{O-Mi}$) will result in a sudden movement of the mechanical layer 107, and therefore the mirror surface 108. One of ordinary skill in the art will appreciate that the same explanation may be made with regard to the operation of the MEMS device 200 of FIGS. 8C and 8D with modifications in view of the architectural differences.

Tunable MEMS Architecture

Embodiments of the invention enable tuning of the interferometric cavity depth of a MEMS device in both of the first and second segments 301 and 303 ($0 \leq x \leq D$). To achieve the tuning in the second segment 303 ($D/3 \leq x \leq D$), embodiments of the invention may use one or more forces other than the forces identified above, which are the mechanical restoration force of a mechanical layer and the electrostatic force between a mirror surface and an optical layer. Embodiments of the invention make displacement of the mirror surface have a tunable relationship, preferably a substantially linear relationship, with changes in voltages applied between one or more sets of electrodes.

Figure 10A:
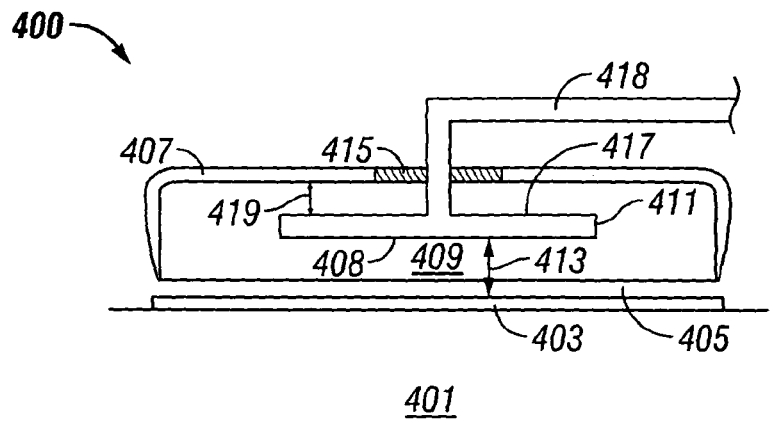
FIG. 10A is a side cross-sectional view illustrating a configuration of an analog MEMS device in an undriven state according to an embodiment of the invention.

In one embodiment illustrated in FIG. 10A, a MEMS device 400 is formed on a substrate 401. The MEMS device 400 comprises an optical layer 403, a dielectric layer 405 and a mechanical layer 407. The substrate 401, optical layer 403 and dielectric layer 405 have generally the same characteristics and features as the corresponding layers of the MEMS device 100, unless specifically stated otherwise. The mechanical layer 407 comprises an area of insulation material, which is referred to as an insulator 415. A mirror 411 is located between the dielectric layer 405 and the mechanical layer 407. The mirror has a highly reflective surface 408 and is made of a conductive material. The mirror 411 is mechanically connected to the mechanical layer 407 via the insulator 415. Unlike the mirror 211 in the MEMS device 200 illustrated in FIG. 8C, the mirror 411 is electrically disconnected or isolated from the mechanical layer 407 while mechanically connected thereto by the insulator 415. With a conductive extension 418, the mirror 411 may be electrically connected to another electric voltage or current source, which is independent of the mechanical layer 407. The mechanical layer 407 is conductive and patterned into columns (not illustrated). A cavity 409 is formed between the mirror surface 408 and the dielectric layer 405. The depth of the interferometric cavity 413 is the distance between the mirror surface 408 and the optical layer 403 (not the dielectric layer 405).

One of ordinary skill in the art will appreciate processes available for the manufacturing of the MEMS device 400 and an array thereof comprising a plurality of the MEMS devices 404 arranged in a two-dimensional plane. Particularly, one of ordinary skill in the art will appreciate processes and materials available for forming the insulator 415 in the middle of the mechanical layer 407 and for forming the mirror 411 so as to be mechanically connected to but electrically isolated from the mechanical layer.

In one embodiment, movement of the mirror surface 408 within the first segment 301 ($0 \leq x \leq D/3$ in FIG. 9) and within the second segment 303 ($D/3 \leq x \leq D$ in FIG. 9) is tuned or controlled by electric potential differences between different two or more sets of electrodes. More specifically, movement of the mirror surface 408 within the first segment 301 ($0 \leq x \leq D/3$) is tuned by the difference between a voltage ($V_{Mi}$) of the mirror 411 and a voltage ($V_O$) of the optical layer 403 while maintaining a voltage ($V_{Mi}$) of the mirror 411 and a voltage ($V_{Me}$) of the mechanical layer 407 at the same level. The movement of the mirror surface 408 within the second segment 303 ($D/3 \leq x \leq D$) may be tuned by the difference between a voltage ($V_{Mi}$) of the mirror 411 and a voltage ($V_{Me}$) of the mechanical layer 407 while maintaining or changing a voltage difference between the mirror 411 and the optical layer 403.

The displacement of the mirror 411 or mirror surface 408 in response to the electric potential difference between the optical layer 403 and the mirror 411 follows the relationship discussed above with reference to FIG. 9 if the voltage at the mirror 411 is maintained the same as the mechanical layer 407. Thus, if the voltage ($V_{Mi}$) of the mirror 411 is maintained the same as the voltage ($V_{Me}$) of the mechanical layer 407, the displacement of the mirror 411 within the first segment 301 is generally proportional to the voltage ($V_{O-Mi}$), which is the difference between the voltage ($V_O$) of the optical layer 403 and the voltage ($V_{Mi}$) of the mirror 411. The displacement of the mirror is represented by the solid line 304 of FIG. 9. As discussed above, in the first segment 301, the proportional or tunable relationship is accomplished by equilibrium of the mechanical restoration force in the mechanical layer 407 with the attractive electrostatic force between the mirror 411 and the optical layer 403.

In the second segment 303 ($D/3 \leq x \leq D$), if the voltage of the mirror 411 is maintained the same as the mechanical layer 407 and the voltage difference ($V_{O-Mi}$) increases beyond the threshold voltage ($V_{th}$), a strong attractive electrostatic force between the mirror 411 and the optical layer 403 will break the equilibrium. Thus, the displacement of the mirror in the second segment 303 by an infinitesimal increase of the voltage ($V_{O-Mi}$) beyond the threshold voltage ($V_{th}$) is represented by the solid line 305 of FIG. 9.

To maintain an equilibrium state in the second segment 303 ($D/3 \leq x \leq D$), in one embodiment, the electrostatic attractive force between the optical layer 403 and the mirror 411 created by the potential difference ($V_{O-Mi}$) may be balanced by the mechanical restoration force of the mechanical layer 407 and by an electrostatic force created by the voltage ($V_{Mi-Me}$), which is the difference between the voltage ($V_{Mi}$) of the mirror 411 and the voltage ($V_{Me}$) of the mechanical layer 407. In this embodiment, equilibrium of the forces exerted to the mirror 411 can be maintained throughout the second segment 303 or at least a portion of the second segment. Thus, the displacement of the mirror 411 may be tunable by changing the voltage ($V_{Mi-Me}$). The dashed line 307 of FIG. 9 represents an example of the tunable displacement of the mirror 411 in the second segment.

The electrostatic force between the mirror 411 and the mechanical layer 407 is represented by the following equation:

$$F_{eMi-Me} = \frac{d}{dx}\left(\frac{1}{2}CV_{Mi-Me}^2\right) \quad \text{Equation 3}$$

$$C_{Mi-Me} = \frac{\varepsilon A}{d' + x} \quad \text{Equation 4}$$

In the foregoing equations, $F_{eMi-Me}$ represents the electrostatic force exerted on the mirror 411 created by the voltage ($V_{Mi-Me}$) applied between the mechanical layer 407 and the mirror 411. "$C_{Mi-Me}$" represents capacitance between two electrodes, which are the mirror 411 and the mechanical layer 407. "$\varepsilon$" is the effective permittivity of the materials located between two electrodes, which are again the mirror 411 and the mechanical layer 407. "A" is an effective overlapping area of the two opposing electrodes, which is in this case the area of a surface 417 of the mirror facing the mechanical layer 407. "d'" is a distance between the two electrodes, which is in this case the distance 419 between the mechanical layer 407 and the surface 417 of the mirror in the undriven configuration as illustrated in FIG. 10A. "x" represents the displacement of the mirror 411 or mirror surface 408 in the direction toward the optical layer 403 from its position in the undriven configuration.

In another embodiment, the location of the mirror surface 408 (and therefore the interferometric cavity depth 113) may be tuned by creating equilibrium among all the forces exerted on the mirror 411. In other words, the net force applied to the mirror 411 is substantially zero at any position of the mirror 411. With regard to the electrostatic forces, for example, there are electrostatic forces based on the voltage ($V_{O-Mi}$) between the mirror 411 and the optical layer 403, the voltage ($V_{Mi-Me}$) between the mirror 411 and the mechanical layer 407, and the voltage ($V_{Me-O}$) between the mechanical layer 407 and the optical layer 403. With regard to the mechanical restoring forces, for example, there may be mechanical restoring forces based on the tension formed in the mechanical layer 407 and the tension formed in the conductive extension 418 when the mirror 411 is displaced at all from the undriven position (x=0) toward the driven position (x=D). For example, the relationship among the forces may be represented by the following equation.

$$F_{eO-Mi} + F_{eO-Me} = F_{mR} + F_{eMi-Me} \quad \text{Equation 5}$$

Figure 10B:
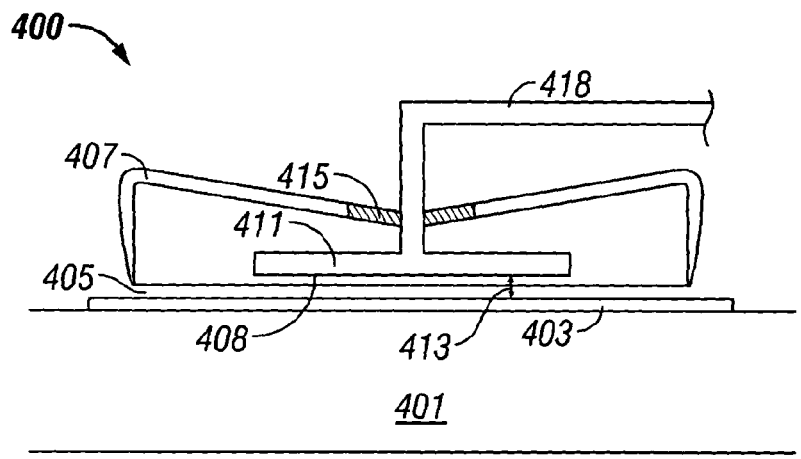
FIG. 10B is a side cross-sectional view illustrating a configuration of the MEMS device of FIG. 10A in a driven state.

In the foregoing equation, "$F_{mR}$" represents the mechanical restoration force of the mechanical layer 407, which is determined by the configuration and material of the mechanical layer 407. "$F_{eO-Mi}$" represents the electrostatic force created by the voltage difference ($V_{O-Mi}$) between the optical layer 403 and the mirror 411. See Equation 1 above. "$F_{eMi-Me}$" represents the electrostatic force created by the voltage ($V_{Mi-Me}$) applied between the mirror 411 and the mechanical layer 407. See Equation 3 above. "$F_{eO-Me}$" represents the electrostatic force created by the voltage ($V_{O-Me}$) applied between the optical layer 403 and the mechanical layer 407. Generally, the force "$F_{eO-Me}$" will be smaller than the other forces in Equation 5 as the mirror 411 shields the mechanical layer 407 from the optical layer 403. One of ordinary skill in the art will be able to formulate an equation representing "$F_{eO-Me}$" in view of the slanting or deforming configuration of the mechanical layer 407 when the MEMS device 400 is in a driven state as illustrated in FIG. 10B. One of ordinary skill in the art will be able to formulate an equation more accurately representing the equilibrium of various forces applied to the mirror in a particular MEMS architecture by considering additional forces in the MEMS device 400. For example, if the extension 418 of the mirror 411 is structurally connected with a part of the MEMS device 400 or the array thereof (not illustrated), mechanical forces caused by such structural connection will be considered in creating the conditions for the equilibrium among the forces acting on the mirror 411.

Figure 11:
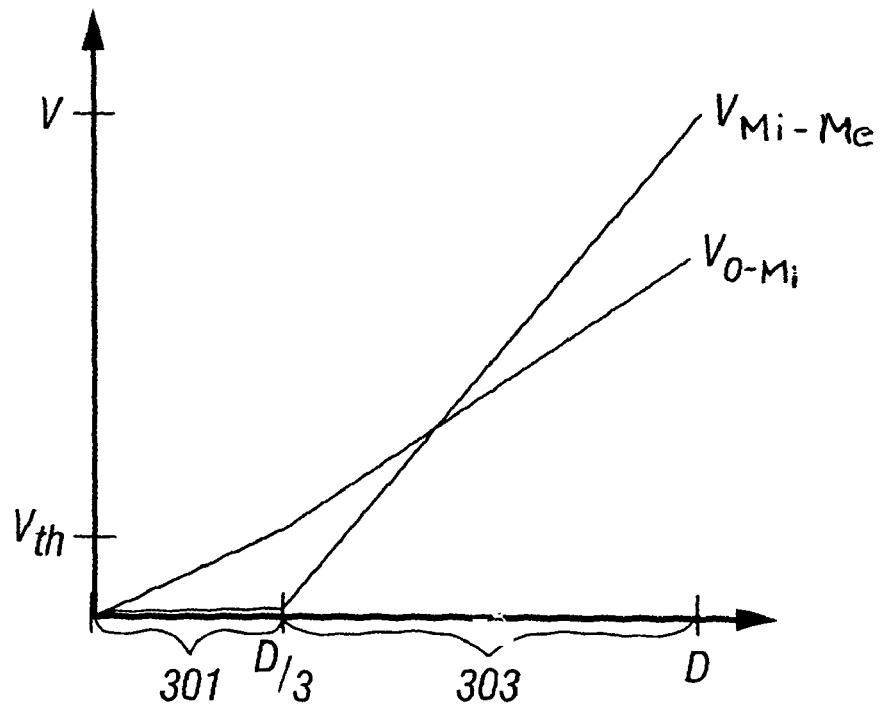
FIG. 11 is a graph illustrating the relationship between the position of mirror and voltage differences applied between electrodes of a MEMS device according to an embodiment of the invention.

FIG. 11 illustrates exemplary voltage differences applied among the three electrodes (mirror 411, mechanical layer 407 and optical layer 403) to create a highly tunable MEMS device. In first segment 301, the voltages of the optical layer 403 and the mirror 411 are maintained at the same level, and the voltage difference ($V_{Mi-Me}$) between the mirror 411 and the mechanical layer 407 can be changed between zero and the threshold voltage ($V_{th}$). As the voltage difference ($V_{Mi-Me}$) changes, the mirror 411 may move or stay within the first segment 301 (0≦x≦D/3), for example, along the line 304 of FIG. 9. In the second segment 303, different voltages are applied to the mirror 411 and the mechanical layer 407, and the voltage difference ($V_{Mi-Me}$) between the mirror 411 and the mechanical layer 407 may further change to create equilibrium among the forces applied to the mirror 411. Accordingly, the mirror 411 may move or stay within the second segment 303 (D/3≦x≦D), for example, along the line 307 of FIG. 9. Actual voltage differences ($V_{Mi-Me}$) and ($V_{O-Mi}$) to create the balance among the forces may differ from those illustrated in FIG. 11, depending upon other factors, including the strength of the mechanical restoring forces of the mechanical layer 407 and/or the extension 418.

In another embodiment of the tunable MEMS device, the location of the mirror 411 may be tuned by creating equilibrium among the forces applied to the mirror while maintaining the voltage difference ($V_{O-Mi}$) between the optical layer 403 and the mirror 411 substantially constant when the mirror is moving within at least a portion of the second segment (D/3≦x≦D). In still another embodiment, the location of the mirror can be tuned while maintaining the voltage difference ($V_{Mi-Me}$) between the mirror 411 and the mechanical layer substantially constant when the mirror is moving within at least a portion of the second segment (D/3≦x≦D). One of ordinary skill in the art will appreciate that the equilibrium of the forces applied to the mirror 411 can be accomplished by controlling the voltage differenes ($V_{Mi-Me}$) and ($V_{O-Mi}$) in a number of different ways.

In one embodiment, the tunable MEMS device provides an analog device that is tunable substantially throughout a range of linear or non-linear movement of the mirror 411 within an interferometric cavity. In one embodiment, the analog MEMS device may be used as a reflective display element tunable to any colored visible light or tunable to any wavelength of light, including radio frequency. In other embodiment, the analog MEMS device may be used as a completely tunable capacitor.

Adjusting Parameters of Tunable MEMS Devices

In further embodiments of the invention, various parameters of the MEMS devices may be changed, which affect the size of the above-described forces to create a desired relationship between the movement of the mirror 411 and the potential difference(s) applied to electrodes of a MEMS device. The parameters affecting the size of the restoration force include the properties of the material used for the mechanical layer 407 and its geometrical configuration. The parameters affecting the size of the electrostatic forces are an effective overlapping area of two opposing electrodes (A), dielectric permittivity (∈), and a distance between two electrodes (d or d') in Equations (1-4). One of ordinary skill in the art will appreciate and develop combinations of varying parameters to form a desired relationship between the movement of the mirror 411 and the voltages applied to the three electrodes of MEMS device 400, which are the optical layer 403, the mechanical layer 407 and the mirror 411.

Tunable MEMS Capacitors

In one embodiment, an analog MEMS device may be used as a tunable capacitor as it can store charges on the electrodes embedded in the MEMS device. The capacitance between two electrodes may be tunable because it is inversely proportional to the displacement of the mirror (Equations 2 and 4) and the displacement of the mirror is tunable by voltages changes applied to the electrodes of the MEMS device as discussed above. In addition, the capacitance of the tunable capacitor can be further adjustable by changing various parameters of the MEMS device, including the effective overlapping area of two opposing electrodes (A), dielectric permittivity (∈), and distance between two electrodes (d or d').

Figure 12A:
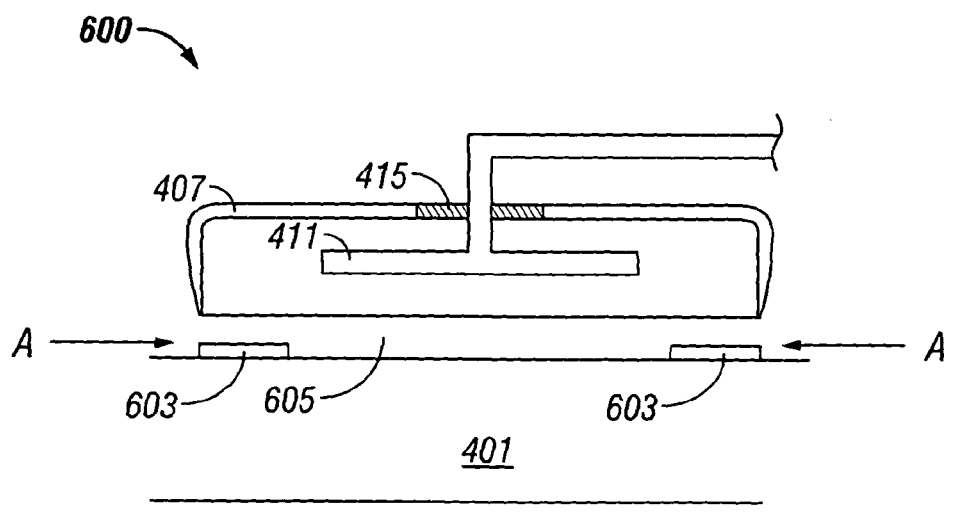
FIG. 12A is a side cross-sectional view illustrating an embodiment of a MEMS device, in which an optical layer has a different size from the embodiment of FIG. 10A.
Figure 12B:
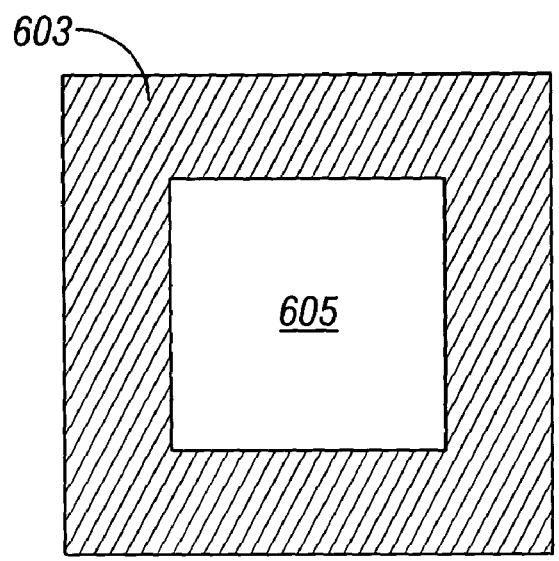
FIG. 12B is a plan cross-sectional view illustrating a size of the optical layer in the MEMS device of FIG. 12A.

FIGS. 12A and 12B illustrate an embodiment of an MEMS device 600, wherein an optical layer 603 is formed only in a partial area of the optical layer 403 of the MEMS device 400 illustrated in FIG. 10A. FIG. 12B is a plan cross-sectional view of the MEMS device 600 taken along the line A-A indicated in FIG. 12A and being parallel with the surface of the substrate 401. As illustrated in FIG. 12B, the optical layer 603 is formed in a configuration in which the optical layer 603 surrounds a square or rectangular dielectric layer 605. This embodiment provides a reduced the area of the optical layer 603, and therefore the effective overlapping area of the optical layer 603 with the mirror surface 408 and the mechanical layer 407. By varying the effective overlapping area (A), the capacitance of the tunable MEMS capacitor can be adjusted. The size of the optical layer 603 affects the effective overlapping area in Equation 2 above and will affect the electrostatic forces, $F_{eO-Mi}$ (Equation 1). On the other hand, the size of the optical layer 603 does not affect the other electrostatic force, $F_{eMi-Me}$ (Equation 3). One of ordinary skill in the art will appreciate that variations in the location and/or geometry of the optical layer 603 will further affect certain electrostatic forces. Further, the parameter A may be designed by altering the size, location and/or geometry of the mechanical layer 107 and/or one or both of the mirror surfaces 408 and 417.

Figure 13:
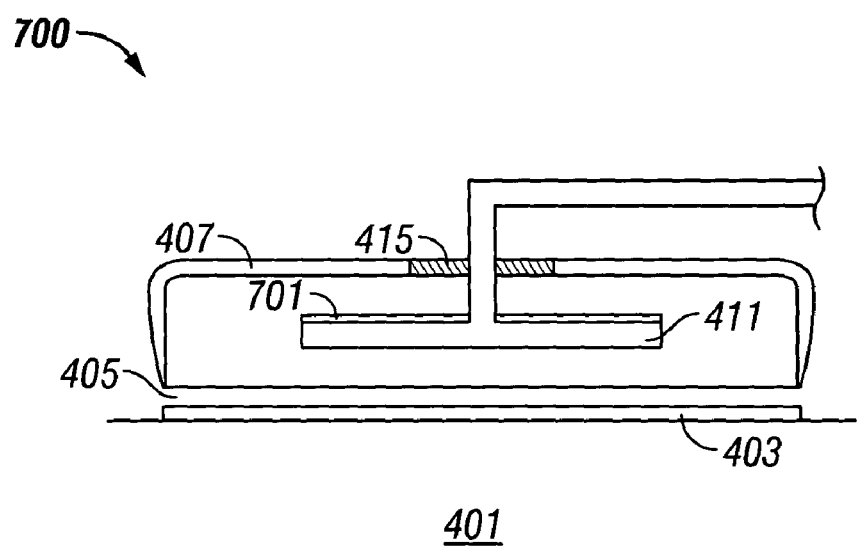
FIG. 13 is a side cross-sectional view illustrating another embodiment of a MEMS device, in which a dielectric constant is different from the embodiment of FIG. 10A.

FIG. 13 illustrates an embodiment of an MEMS device 700, in which a layer 701 of a non-conductive material is formed on the mirror 411 facing the mechanical layer 407. The layer 701 is provided to adjust the dielectric permittivity in Equation 4 above, and therefore affect the electrostatic force $F_{eMi-Me}$ while not affecting the other electrostatic force, $F_{eO-Mi}$ or $F_{eO-Me}$. The dielectric permittivity will depend on the material of the layer 701. One of ordinary skill in the art will be able to select an appropriate non-conductive or dielectric material to provide a desired dielectric permittivity in a particular design of the MEMS device 700. In another embodiment, a dielectric layer may be formed on a surface of the mechanical layer 407 facing the mirror 411. In still another embodiment, a dielectric layer may be formed on the mirror surface 408. In a further embodiment, another dielectric layer may be formed on the dielectric layer 405, in which the other dielectric layer is formed of a material different from that of the dielectric layer 405. One of ordinary skill in the art will appreciate variations and combinations of dielectric layers in the size, thickness and/or location. By providing the dielectric layer(s) and varying the configuration, the capacitance of the tunable MEMS capacitor can be further adjusted.

Figure 14:
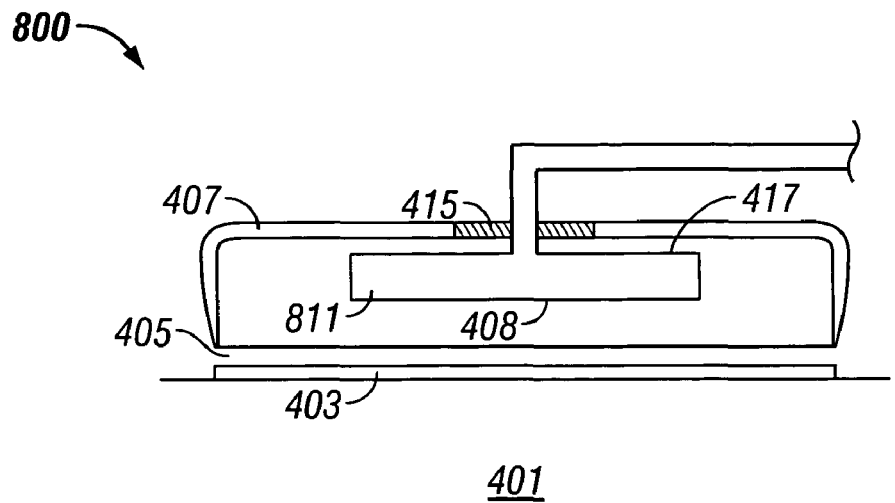
FIG. 14 is a side cross-sectional view illustrating still another embodiment of a MEMS device, in which the thickness of a mirror is different from the embodiment of FIG. 10A.

FIG. 14 illustrates an embodiment of a MEMS device 800, in which a mirror 811 has a thickness greater than that of the MEMS device 400 while all the other conditions are the same. The design of a thicker mirror 811 changes the distances between the electrodes in the MEMS device 400. If the distance (d) between the optical layer 403 and the mirror surface 408 remains the same as in the MEMS device 400, the distance (d') between the mechanical layer 407 and the surface 417 of the mirror 411 will be shorter if the mirror 811 is designed to be thicker. The distance (d') affects the force, $F_{eMi-Me}$, (Equations 3 and 4) while not affecting the other force, $F_{eO-Mi}$ (Equations 1 and 2). By designing the thickness of the mirror, one or both of the distances (d) and (d') may be altered. By varying the distances (d) and (d'), the capacitance of the tunable MEMS capacitor can be adjusted.

Variations of Tunable MEMS Architecture

Figure 15:
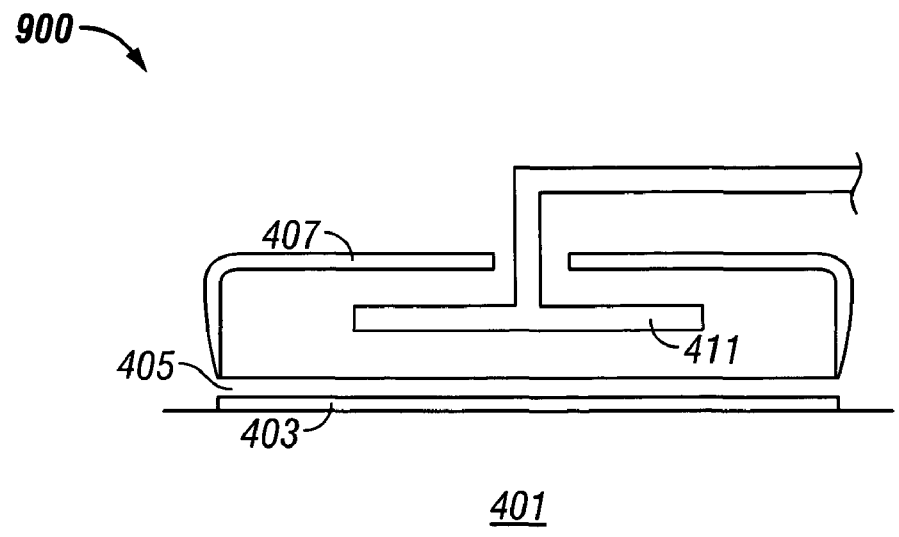
FIG. 15 is a side cross-sectional view illustrating a configuration of a MEMS device without an insulator between a mechanical layer and a mirror.

In another embodiment of a MEMS device 900 illustrated in FIG. 15, the mirror 411 is neither mechanically nor electrically connected to the mechanical layer 407. In this embodiment, the insulator 415 of the MEMS device 900 which mechanically connects the mirror 411 and the mechanical layer 407 is lacking. Due to this lack of mechanical connection, there may be no mechanical restoration force exerted on the mirror 411. Thus, the movement of the mirror 411 may be equilibrated only by the electrostatic forces including $F_{eMi-Me}$ and $F_{eO-Mi}$. In another embodiment, the extension 418 of the mirror 411 may have a structural or mechanical connection with a part of the MEMS device 900 or an array thereof (not illustrated). Then, a restoration force from such a structural connection may be exerted on the mirror 411 in addition to the above-electrostatic forces, all of which will be equilibrate to achieve the tenability between the movement of the mirror 411 and voltages applied to the electrodes of the MEMS device 900, including the optical layer 403, the mechanical layer 407 and the mirror 411.

The foregoing embodiments of the invention allow MEMS devices may be operated as an analog device over full range of the movement of the mirror. These tunable analog MEMS devices may be used to select any wavelengths of light by its interferometric modulation from the light incident to the MEMS device. The MEMS devices may select radio frequencies and may operate as an RF MEMS device. One of ordinary skill in the art will appreciate many other applications of embodiments of the MEMS devices disclosed herein and their variants.

Fabrication of Tunable MEMS Devices

Generally, the tunable MEMS devices of the foregoing embodiments can be fabricated utilizing conventional thin layer forming processes. For example, a partially transparent and electrically conductive layer is deposited on a transparent substrate to provide the optical layer 403. The dielectric layer 405 is deposited over the optical layer 403. Then, a first sacrificial layer (not shown) is formed over the dielectric layer 405. A reflective material is deposited over the first sacrificial layer, and a portion of the reflective material is selectively etched to form the mirror 411. A second sacrificial layer (not shown) is formed over the layer for the mirror 411 and over the first sacrificial layer surrounding the mirror 411. Then, the first and second sacrificial layers are selectively etched to form a plurality of holes exposing the dielectric layer 405. The holes are filled with a dielectric material to form posts (not shown). A conductive material which will later form the mechanical layer 407 is deposited over the posts and the second sacrificial layer. The posts support the mechanical layer 407 separated from the dielectric layer 405 with a gap therebetween once the first and second sacrificial layers are removed.

Thereafter, the mechanical layer 407 is selectively etched to form an opening, which exposes the second sacrificial layer. An insulating material is deposited in the opening of the mechanical layer 407 to form an insulating portion, which will become the insulator 415 later. Then, a third sacrificial layer (not shown) is formed over the mechanical layer 407. The third sacrificial layer is selectively etched to form a plurality of holes, which expose the mechanical layer 407, and a dielectric material is filled in the holes. A conductive layer, which will become the conductive extension 418 to the mirror 411, is formed over the third sacrificial layer including the dielectric material filling the holes. The dielectric materials form posts (not shown) supporting the conductive extension 418 to suspend over the mechanical layer 407.

An opening is formed through the third sacrificial layer, the insulating portion of the mechanical layer 407 and the second sacrificial layer to expose the mirror 411. The opening is filled with a conductive material, which electrically connects the mirror and the conductive extension 418. Thereafter openings are formed to expose the first, second and third sacrificial layers, and an etchant is supplied to the exposed portion of the sacrificial layers through the openings. The etchant reacts with the materials of the sacrificial layers, which turns the sacrificial materials to gas. As a result, the spaces filled with the sacrificial materials become cavities and the MEMS device of FIG. 10A is formed. One of ordinary skill in the art will be able to determine various conditions of the process steps and materials to be used in the processes. Also, one of ordinary skill in the art will appreciate that there are many alternative processes to fabricate tunable MEMS devices.

It is to be understood that persons of skill in the appropriate arts may modify the invention here described while still achieving the favorable results of this invention. Accordingly, the foregoing description is to be understood as being a broad, teaching disclosure directed to persons of skill in the appropriate arts, and not as limiting upon the invention.

What is claimed is:

1. A microelectromechanical system device comprising:
   a first electrode layer;
   a second electrode layer, said second electrode layer being deformable;
   a support structure which separates the first electrode layer from the second electrode layer;
   a reflective element comprising a conductive layer and a reflective surface formed on the conductive layer, the reflective element being movable between a first position and a second position, the first and second positions located between the first and second electrode layers, the conductive layer electrically insulated from the first electrode layer and the second electrode layer, the reflective element spaced apart from the support structure; and
   a conductive extension electrically and mechanically connected to said conductive layer, said conductive extension passing through the second electrode layer;
   wherein the reflective element is responsive to voltages applied to the first electrode layer, the second electrode layer, and the conductive layer by moving between the first position and the second position, wherein said second electrode layer deforms as the reflective element moves between the first and second positions.

2. The device of claim 1, wherein the conductive layer comprises the reflective layer surface.

3. The device of claim 1, wherein a third position is located between the first and second position, and wherein the reflective element spontaneously moves toward the first position when the reflective element is located between the first position and the third position 4. The device of claim 3, wherein the distance between the first position and the third position is about one-third of the distance between the first electrode layer and the second electrode layer.

5. The device of claim 1, wherein the first electrode layer comprises a partially reflective surface.

6. The device of claim 1, wherein the reflective element is mechanically integrated with the second electrode layer.

7. The device of claim 1, wherein the second electrode layer is deformable as the reflective element moves between the first and second positions.

8. The device of claim 7, wherein the conductive extension mechanically integrates the second electrode layer and the reflective element.

9. The device of claim 8, wherein the conductive extension electrically connects the conductive layer to a voltage source.

10. The device of claim 1, wherein the reflective element is mechanically decoupled from the second electrode layer.

11. The device of claim 10, wherein the conductive extension passes through a hole formed in the second electrode layer, and wherein the conductive extension does not contact the second electrode layer.

12. The device of claim 1, wherein the reflective element is capable of being substantially stationary at any position between the first and second positions.

13. The device of claim 1, further comprising a nonconductive layer between the first electrode layer and the reflective element.

14. The device of claim 1, wherein a location of the reflective element between the first and second positions is tunable by controlling voltage differences applied between the first electrode layer and the conductive layer, and between the second electrode layer and the conductive layer.

15. The device of claim 1, wherein the device comprises a tunable capacitor.

16. The device of claim 1, wherein the device comprises a tunable frequency filter for filtering a frequency component of input signals received through the first electrode layer.

17. The device of claim 1, further comprising:
   a display;
   a processor that is in electrical communication with said display, said processor being configured to process image data; and
   a memory device in electrical communication with said processor.

18. The device of claim 17, further comprising:
   a first controller configured to send at least one signal to said display; and
   a second controller configured to send at least a portion of said image data to said first controller.

19. The device of claim 17, further comprising an image source module configured to send said image data to said processor.

20. The device of claim 19, wherein said image source module comprises at least one of a receiver, transceiver, and transmitter.

21. The device of claim 17, further comprising an input device configured to receive input data and to communicate said input data to said processor.

* * * * *

UNITED STATES PATENT AND TRADEMARK OFFICE
CERTIFICATE OF CORRECTION

| | | |
|---|---|---|
| PATENT NO. | : 8,008,736 B2 | Page 1 of 1 |
| APPLICATION NO. | : 11/144546 | |
| DATED | : August 30, 2011 | |
| INVENTOR(S) | : Kothari | |

It is certified that error appears in the above-identified patent and that said Letters Patent is hereby corrected as shown below:

Title Page, in column 2 (page 6 item 56) at line 26, under Other Publications, change "FPDTechnology" to --FPD Technology--.

In column 9 at line 37, change "will," to --will--.

In column 13 at line 54, change "405" to --403--.

In column 19 at line 63, in Claim 2, after "reflective" delete "layer".

Signed and Sealed this
Second Day of October, 2012

David J. Kappos
*Director of the United States Patent and Trademark Office*